(12) United States Patent
Henry et al.

(10) Patent No.: US 10,303,335 B2
(45) Date of Patent: *May 28, 2019

(54) MULTICOMPUTER PROCESSING OF CLIENT DEVICE REQUEST DATA WITH CENTRALIZED EVENT ORCHESTRATION

(71) Applicant: Bank of America Corporation, Charlotte, NC (US)

(72) Inventors: Dean L. Henry, Charlotte, NC (US); Matthew R. Leavenworth, Charlotte, NC (US); Ather Williams, III, Ridgewood, NJ (US); Eileen M. Holcomb, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/372,798

(22) Filed: Dec. 8, 2016

(65) Prior Publication Data
US 2018/0164956 A1    Jun. 14, 2018

(51) Int. Cl.
*G06F 17/00*   (2019.01)
*G06F 3/0482*   (2013.01)

(52) U.S. Cl.
CPC .................. *G06F 3/0482* (2013.01)

(58) Field of Classification Search
CPC .............. G06F 17/30864; H04L 63/0876
See application file for complete search history.

(56) References Cited

U.S. PATENT DOCUMENTS

| | | |
|---|---|---|
| 5,787,402 A | 7/1998 | Potter et al. |
| 6,247,000 B1 | 6/2001 | Hawkins et al. |
| 6,721,716 B1 | 4/2004 | Gross |
| 7,580,886 B1 | 8/2009 | Schulz |
| 7,689,483 B2 | 3/2010 | Wu et al. |
| 8,560,452 B2 | 10/2013 | Lynch et al. |
| 8,606,705 B2 | 12/2013 | Zanzot et al. |

(Continued)

OTHER PUBLICATIONS

Aug. 2, 2018 U.S. Non-Final Office Action—U.S. Appl. No. 15/837,667.

*Primary Examiner* — Abiy Getachew
(74) *Attorney, Agent, or Firm* — Banner & Witcoff, Ltd.; Michael A. Springs

(57) ABSTRACT

Aspects of the disclosure relate to multicomputer processing of client device request data with centralized event orchestration. A computing platform may receive, from a client computing device, event definition information defining an event. Subsequently, the computing platform may receive, from a recipient computing device associated with the event, a request for a delivery selection user interface. The computing platform may send the delivery selection user interface to the recipient computing device and may receive, from the recipient computing device, delivery selection information identifying a destination for the event selected by a user of the recipient computing device. Subsequently, the computing platform may generate one or more event orchestration commands directing an external event processor to execute one or more actions associated with the event, and may send the one or more event orchestration commands to the external event processor via an external event processing interface.

20 Claims, 13 Drawing Sheets

(56) References Cited

U.S. PATENT DOCUMENTS

| | | | |
|---|---|---|---|
| 8,620,805 B2 | 12/2013 | Davis et al. | |
| 9,087,215 B2 * | 7/2015 | LaFever | G06F 21/6254 |
| 9,779,253 B2 * | 10/2017 | Mahaffey | H04L 63/1433 |
| 9,781,148 B2 * | 10/2017 | Mahaffey | H04L 63/1433 |
| 2010/0280949 A1 | 11/2010 | Van Rensburg | |
| 2011/0282780 A1 | 11/2011 | French et al. | |
| 2016/0182331 A1 | 6/2016 | Iannaccone et al. | |
| 2016/0184701 A1 | 6/2016 | Weston et al. | |
| 2016/0187654 A1 | 6/2016 | Border et al. | |
| 2016/0188181 A1 | 6/2016 | Smith | |
| 2016/0189299 A1 | 6/2016 | Chiulli et al. | |
| 2016/0196553 A1 | 7/2016 | Barhydt | |
| 2016/0196587 A1 | 7/2016 | Eder | |
| 2016/0196608 A1 | 7/2016 | Chiulli et al. | |
| 2016/0197993 A1 | 7/2016 | Perkowski et al. | |
| 2016/0205174 A1 | 7/2016 | Pitio et al. | |
| 2016/0209648 A1 | 7/2016 | Haddick et al. | |
| 2016/0210224 A1 | 7/2016 | Cohen et al. | |
| 2016/0210605 A1 | 7/2016 | Vaish et al. | |
| 2016/0217258 A1 | 7/2016 | Pitroda et al. | |
| 2016/0219152 A1 | 7/2016 | Fernandez et al. | |
| 2016/0224951 A1 | 8/2016 | Hoffberg | |
| 2016/0226308 A1 | 8/2016 | Valin et al. | |
| 2016/0226836 A1 | 8/2016 | Garcia et al. | |
| 2016/0240050 A1 | 8/2016 | Block et al. | |
| 2016/0246616 A1 | 8/2016 | Kwong | |
| 2016/0247148 A1 | 8/2016 | Jivan et al. | |
| 2016/0253360 A1 | 9/2016 | Gradin et al. | |
| 2016/0253650 A1 | 9/2016 | Cohen | |
| 2016/0260067 A1 | 9/2016 | Holman et al. | |
| 2016/0260069 A1 | 9/2016 | Holman et al. | |
| 2016/0266939 A1 | 9/2016 | Shear et al. | |
| 2016/0275558 A1 | 9/2016 | Tiku et al. | |
| 2016/0275760 A1 | 9/2016 | Block et al. | |
| 2016/0283923 A1 | 9/2016 | Hertel et al. | |
| 2016/0291863 A1 | 10/2016 | Miron | |
| 2016/0292683 A1 | 10/2016 | Song et al. | |
| 2016/0292786 A1 | 10/2016 | Khizhnyak et al. | |
| 2016/0292963 A1 | 10/2016 | Chun et al. | |
| 2016/0300196 A1 | 10/2016 | Guido et al. | |
| 2016/0300197 A1 | 10/2016 | Guido et al. | |
| 2016/0300198 A1 | 10/2016 | Guido et al. | |
| 2016/0300199 A1 | 10/2016 | Guido et al. | |
| 2016/0300204 A1 | 10/2016 | Guido et al. | |
| 2016/0306751 A1 | 10/2016 | Amarendran et al. | |
| 2016/0306984 A1 | 10/2016 | Amarendran et al. | |
| 2016/0314443 A1 | 10/2016 | Liberty | |
| 2016/0314640 A1 | 10/2016 | Ward et al. | |
| 2016/0321624 A1 | 11/2016 | Brunner | |
| 2016/0328706 A1 | 11/2016 | Kennedy | |
| 2016/0328723 A1 | 11/2016 | Cunnane | |
| 2016/0342977 A1 | 11/2016 | Lam | |
| 2016/0343081 A1 | 11/2016 | Somech et al. | |
| 2016/0343094 A1 | 11/2016 | Forbes, Jr. | |
| 2016/0343100 A1 | 11/2016 | Davenport et al. | |
| 2016/0350856 A1 | 12/2016 | Sandhu et al. | |

* cited by examiner

MULTICOMPUTER PROCESSING OF CLIENT DEVICE REQUEST DATA WITH CENTRALIZED EVENT ORCHESTRATION

BACKGROUND

Aspects of the disclosure relate to electrical computers, digital processing systems, and multicomputer data transferring. In particular, one or more aspects of the disclosure relate to multicomputer processing of client device request data with centralized event orchestration.

As computer systems are increasingly utilized to provide automated and electronic services, such computer systems may obtain and maintain increasing amounts of various types of sensitive information, and ensuring the safety and security of this information may be increasingly important. In many instances, however, it may be difficult to ensure the safety and security of such information while also optimizing the efficient and effective technical operations of the computer systems that maintain such information and/or provide such automated and electronic services.

SUMMARY

Aspects of the disclosure provide effective, efficient, scalable, and convenient technical solutions that address and overcome the technical problems associated with providing information security and optimizing the efficient and effective technical operations of computer systems. In particular, one or more aspects of the disclosure provide techniques for processing client device request data using multicomputer processing and centralized event orchestration to improve information security and enhance technical performance.

In accordance with one or more embodiments, a computing platform having at least one processor, a memory, and a communication interface may receive, via the communication interface, from a first client computing device, first event definition information defining a first event. Subsequently, the computing platform may receive, via the communication interface, from a first recipient computing device associated with the first event, a request for a first delivery selection user interface. Then, the computing platform may send, via the communication interface, to the first recipient computing device associated with the first event, the first delivery selection user interface. Thereafter, the computing platform may receive, via the communication interface, from the first recipient computing device associated with the first event, first delivery selection information identifying a first destination for the first event selected by a user of the first recipient computing device associated with the first event. Subsequently, the computing platform may generate, based on the first delivery selection information identifying the first destination for the first event received from the first recipient computing device associated with the first event, one or more first event orchestration commands directing a first external event processor to execute one or more actions associated with the first event. Then, the computing platform may send, via the communication interface and via an external event processing interface, to the first external event processor, the one or more first event orchestration commands directing the first external event processor to execute the one or more actions associated with the first event.

In some embodiments, receiving the first event definition information defining the first event may include receiving information defining one or more parameters of the first event from the first client computing device. In some instances, the information defining the one or more parameters of the first event may include information defining the first event as a single event having a single occurrence. In some instances, the information defining the one or more parameters of the first event may include information defining the first event as a recurring event having multiple occurrences.

In some embodiments, the first recipient computing device associated with the first event may be linked to a first alias identified as a recipient in the first event definition information. In some instances, the first alias identified as the recipient in the first event definition information may include an email address. In some instances, the first alias identified as the recipient in the first event definition information may include a mobile telephone number.

In some embodiments, the first delivery selection user interface may include a first user-selectable control element that, when invoked by the user of the first recipient computing device associated with the first event, causes the first recipient computing device associated with the first event to generate the first delivery selection information identifying the first destination for the first event.

In some embodiments, prior to sending the first delivery selection user interface to the first recipient computing device associated with the first event, the computing platform may send, via the communication interface, to a user interface computing platform, one or more commands directing the user interface computing platform to generate the first delivery selection user interface. Subsequently, the computing platform may receive, via the communication interface, from the user interface computing platform, the first delivery selection user interface.

In some embodiments, prior to generating the one or more first event orchestration commands directing the first external event processor to execute the one or more actions associated with the first event, the computing platform may validate the first delivery selection information identifying the first destination for the first event received from the first recipient computing device associated with the first event.

In some embodiments, the computing platform may receive, via the communication interface, from a second client computing device, second event definition information defining a second event. Subsequently, the computing platform may receive, via the communication interface, from a second recipient computing device associated with the second event, a request for a second delivery selection user interface. Then, the computing platform may send, via the communication interface, to the second recipient computing device associated with the second event, the second delivery selection user interface. Thereafter, the computing platform may receive, via the communication interface, from the second recipient computing device associated with the second event, second delivery selection information identifying a second destination for the second event selected by a user of the second recipient computing device associated with the second event. Subsequently, the computing platform may generate, based on the second delivery selection information identifying the second destination for the second event received from the second recipient computing device associated with the second event, one or more second event orchestration commands directing a second external event processor to execute one or more actions associated with the second event. Then, the computing platform may send, via the communication interface and via the external event processing interface, to the second external event processor, the one or more second event orchestration commands directing the second external event processor to execute the one or more actions associated with the second event.

In some embodiments, receiving the second event definition information defining the second event may include receiving information defining one or more parameters of the second event from the second client computing device. In some instances, the information defining the one or more parameters of the second event may include information defining the second event as a single event having a single occurrence. In some instances, the information defining the one or more parameters of the second event may include information defining the second event as a recurring event having multiple occurrences.

In some embodiments, the second recipient computing device associated with the second event may be linked to a second alias identified as a recipient in the second event definition information. In some instances, the second alias identified as the recipient in the second event definition information may include an email address. In some instances, the second alias identified as the recipient in the second event definition information may include a mobile telephone number.

In some embodiments, the second delivery selection user interface may include a second user-selectable control element that, when invoked by the user of the second recipient computing device associated with the second event, causes the second recipient computing device associated with the second event to generate the second delivery selection information identifying the second destination for the second event.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to enabling a recipient of a cross-border and/or cross-currency payment to select the manner in which the payment is to be received. For example, the recipient may select to receive the payment into a particular digital wallet of a plurality of digital wallets, a particular bank account of a plurality of bank accounts, or the like. The payment may be made to the recipient by an organization, such as a treasury client of a financial institution, or by an individual.

Figure 1A:
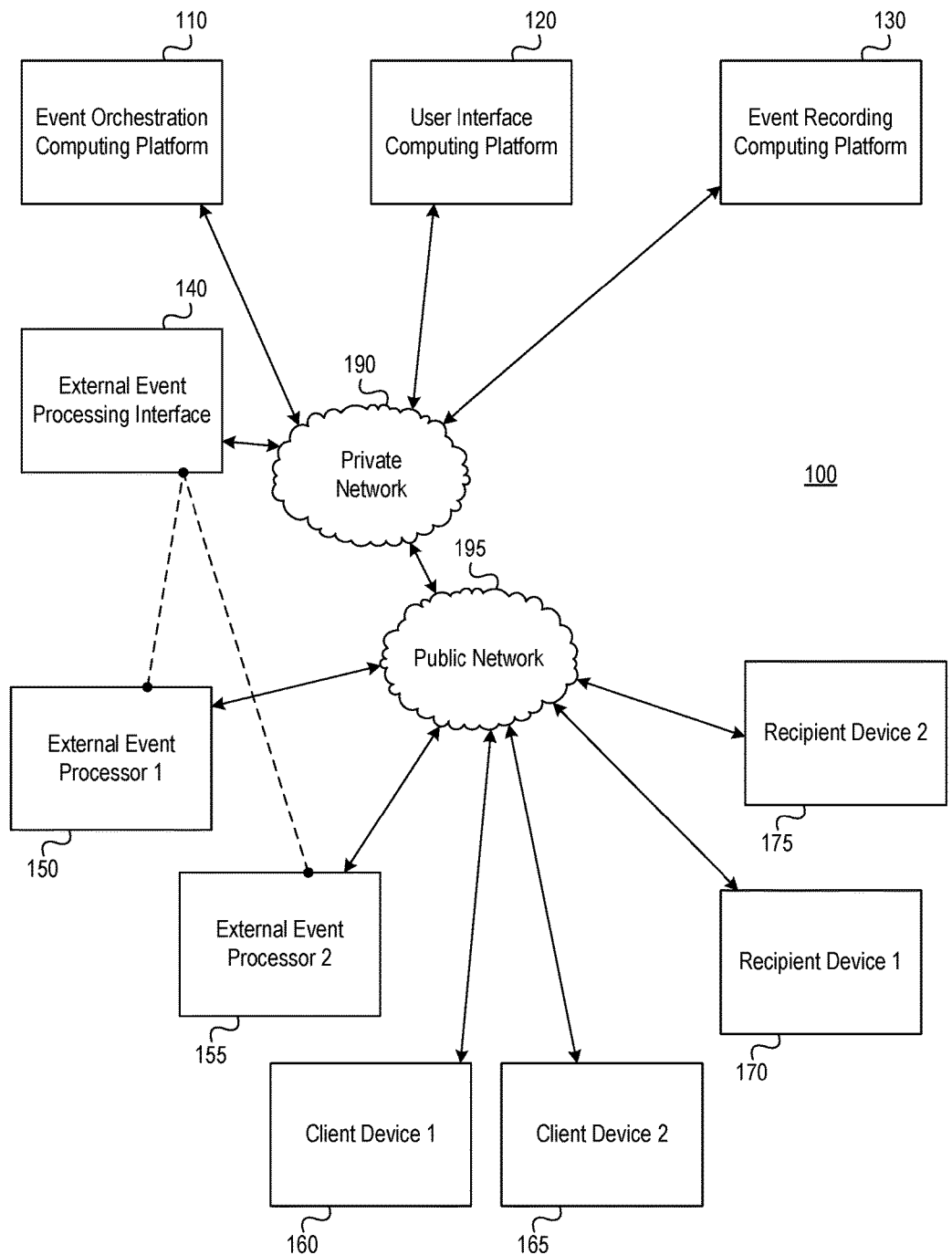
FIGS. 1A and 1B depict an illustrative computing environment for multicomputer processing of client device request data with centralized event orchestration in accordance with one or more example embodiments.
Figure 1B:
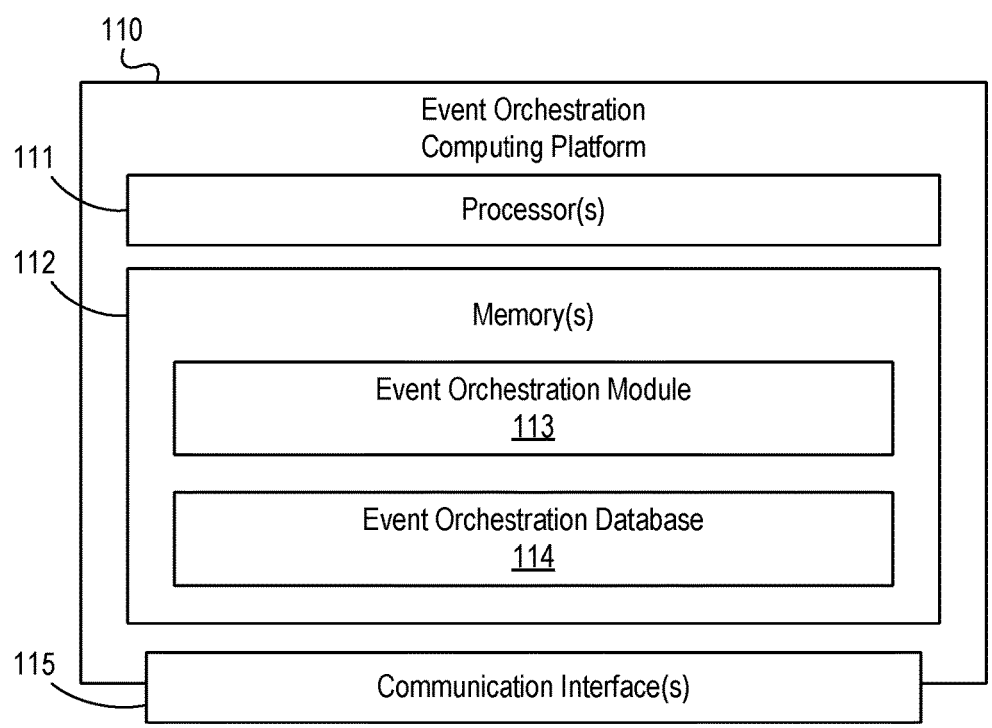

FIGS. 1A and 1B depict an illustrative computing environment for multicomputer processing of client device request data with centralized event orchestration in accordance with one or more example embodiments. Referring to FIG. 1A, computing environment 100 may include one or more computing devices and/or other computer systems. For example, computing environment 100 may include an event orchestration computing platform 110, a user interface computing platform 120, an event recording computing platform 130, an external event processing interface 140, a first external event processor 150, a second external event processor 155, a first client computing device 160, a second client computing device 165, a first recipient computing device 170, and a second recipient computing device 175.

Event orchestration computing platform 110 may be configured to orchestrate events that are defined and/or requested by one or more client devices, control and/or direct actions of other devices and/or computer systems (e.g., in orchestrating events that are defined and/or requested by one or more client devices and/or in performing other actions), and/or perform other functions, as discussed in greater detail below. In some instances, event orchestration computing platform 110 may perform and/or provide one or more transaction processing functions, risk analysis functions, and/or other related functions.

User interface computing platform 120 may be configured to generate one or more user interfaces that are provided to other computer systems and/or devices in computing environment 100, including client computing device 160, client computing device 165, recipient computing device 170, and recipient computing device 175. In some instances, the one or more user interfaces that are generated by user interface computing platform 120 may be served to such other computer systems and/or devices by event orchestration computing platform 110, as illustrated in greater detail below. Event recording computing platform 130 may be configured to store, maintain, and/or update one or more records associated with one or more events occurring in computing environment 100, including one or more events orchestrated by event orchestration computing platform 110 and/or otherwise associated with event orchestration computing platform 110.

External event processing interface 140 may be configured to facilitate processing of one or more events that are orchestrated by event orchestration computing platform 110 and/or otherwise associated with event orchestration computing platform 110 and that may be performed by and/or involve one or more external event processors, such as external event processor 150 and external event processor 155. For example, event orchestration computing platform 110 may be operated by and/or otherwise associated with a particular organization (e.g., a financial institution) and may, in some instances, be configured to orchestrate and/or control one or more events (e.g., payments transactions, including cross-border payment transactions and/or cross-currency payment transactions). In addition, external event processor 150 and external event processor 155 may, for example, be operated by and/or otherwise associated with one or more other organizations (e.g., payment processors, credit networks, debit networks, digital wallet services, and/or the like) different from the particular organization operating event orchestration computing platform 110 (e.g., different from the financial institution operating event orchestration computing platform 110). In some instances, external event processing interface 140 may be provided with and/or include one or more dedicated communication links and/or dedicated communication channels, which may directly and/or securely connect external event processing interface 140 to the one or more external event processors, including external event processor 150 and/or external event processor 155.

External event processor 150 may be operated by and/or configured to process events associated with a first service provider or entity, such as a payment processor, a credit network, a debit network, a digital wallet service, and/or the like. External event processor 155 may be operated by and/or configured to process events associated with a second service provider or entity, such as a payment processor, a credit network, a debit network, a digital wallet service, and/or the like, different from the first service provider. For example, external event processor 150 may be associated with a first payment services provider or digital wallet service operating in a first country and/or maintaining funds in a first currency, and external event processor 155 may be associated with a second payment services provider or digital wallet service operating in a second country and/or maintaining funds in a second currency.

Client computing device 160 may be configured to be used by a first customer of an organization, such as a commercial client or treasury client of a financial institution. In some instances, client computing device 160 may, for example, be registered with the organization and/or one or more computer systems in computing environment 100, such that the organization and/or the one or more computer systems maintain one or more records linking client computing device 160 to the first customer of the organization. Client computing device 165 may be configured to be used by a second customer of the organization (which may, e.g., be different from the first customer of the organization). In some instances, client computing device 165 may, for example, be registered with the organization and/or one or more computer systems in computing environment 100, such that the organization and/or the one or more computer systems maintain one or more records linking client computing device 165 to the second customer of the organization.

Recipient computing device 170 may be configured to be used by a first recipient associated with an event, such as a first recipient of funds associated with a first payment transaction event. Recipient computing device 175 may be configured to be used by a second recipient associated with an event, such as a second recipient of funds associated with a second payment transaction event.

In one or more arrangements, user interface computing platform 120, event recording computing platform 130, external event processing interface 140, external event processor 150, external event processor 155, client computing device 160, client computing device 165, recipient computing device 170, and recipient computing device 175 may be any type of computing device capable of receiving a user interface, receiving input via the user interface, and communicating the received input to one or more other computing devices. For example, user interface computing platform 120, event recording computing platform 130, external event processing interface 140, external event processor 150, external event processor 155, client computing device 160, client computing device 165, recipient computing device 170, and recipient computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user interface computing platform 120, event recording computing platform 130, external event processing interface 140, external event processor 150, external event processor 155, client computing device 160, client computing device 165, recipient computing device 170, and recipient computing device 175 may, in some instances, be special-purpose computing devices configured to perform specific functions.

Computing environment 100 also may include one or more computing platforms. For example, and as noted above, computing environment 100 may include event orchestration computing platform 110. As illustrated in greater detail below, event orchestration computing platform 110 may include one or more computing devices configured to perform one or more of the functions described herein. For example, event orchestration computing platform 110 may include one or more computers (e.g., laptop computers, desktop computers, servers, server blades, or the like).

Computing environment 100 also may include one or more networks, which may interconnect one or more of event orchestration computing platform 110, user interface computing platform 120, event recording computing platform 130, external event processing interface 140, external event processor 150, external event processor 155, client computing device 160, client computing device 165, recipient computing device 170, and recipient computing device 175. For example, computing environment 100 may include private network 190 and public network 195. Private network 190 and/or public network 195 may include one or more sub-networks (e.g., local area networks (LANs), wide area networks (WANs), or the like). Private network 190 may be associated with a particular organization (e.g., a corporation, financial institution, educational institution, governmental institution, or the like) and may interconnect one or more computing devices associated with the organization. For example, event orchestration computing platform 110, user interface computing platform 120, event recording computing platform 130, and external event processing interface 140 may be associated with an organization (e.g., a financial institution), and private network 190 may be associated with and/or operated by the organization, and may include one or more networks (e.g., LANs, WANs, virtual private networks (VPNs), or the like) that interconnect event orchestration computing platform 110, user interface computing platform 120, event recording computing platform 130, and external event processing interface 140 and one or more other computing devices and/or computer systems that are used by, operated by, and/or otherwise associated with the organization. Public network 195 may connect private network 190 and/or one or more computing devices connected thereto (e.g., event orchestration computing platform 110, user interface computing platform 120, event recording computing platform 130, and external event processing interface 140) with one or more networks and/or computing devices that are not associated with the organization. For example, external event processor 150, external event processor 155, client computing device 160, client computing device 165, recipient computing device 170, and recipient computing device 175 might not be associated with an organization that operates private network 190 (e.g., because external event processor 150, external event processor 155, client computing device 160, client computing device 165, recipient computing device 170, and recipient computing device 175 may be owned, operated, and/or serviced by one or more entities different from the organization that operates private network 190, such as one or more customers of the organization and/or vendors of the organization, rather than being owned and/or operated by the organization itself or an employee or affiliate of the organization), and public network 195 may include one or more networks (e.g., the internet) that connect external event processor 150, external event processor 155, client computing device 160, client computing device 165, recipient computing device 170, and recipient computing device 175 to private network 190 and/or one or more computing devices connected thereto (e.g., event orchestration computing platform 110, user interface computing platform 120, event recording computing platform 130, and external event processing interface 140).

Referring to FIG. 1B, event orchestration computing platform 110 may include one or more processors 111, memory 112, and communication interface 115. A data bus may interconnect processor(s) 111, memory 112, and communication interface 115. Communication interface 115 may be a network interface configured to support communication between event orchestration computing platform 110 and one or more networks (e.g., private network 190, public network 195, or the like). Memory 112 may include one or more program modules having instructions that when executed by processor(s) 111 cause event orchestration computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event orchestration computing platform 110 and/or by different computing devices that may form and/or otherwise make up event orchestration computing platform 110. For example, memory 112 may have, store, and/or include an event orchestration module 113 and an event orchestration database 114. Event orchestration module 113 may have instructions that direct and/or cause event orchestration computing platform 110 to orchestrate one or more events involving one or more other computing devices and/or computer systems in computing environment 100 and/or perform other functions, as discussed in greater detail below. Event orchestration database 114 may store information used by event orchestration module 113 and/or event orchestration computing platform 110 in orchestrating one or more events involving one or more other computing devices and/or computer systems in computing environment 100 and/or in performing other functions.

Figure 2A:
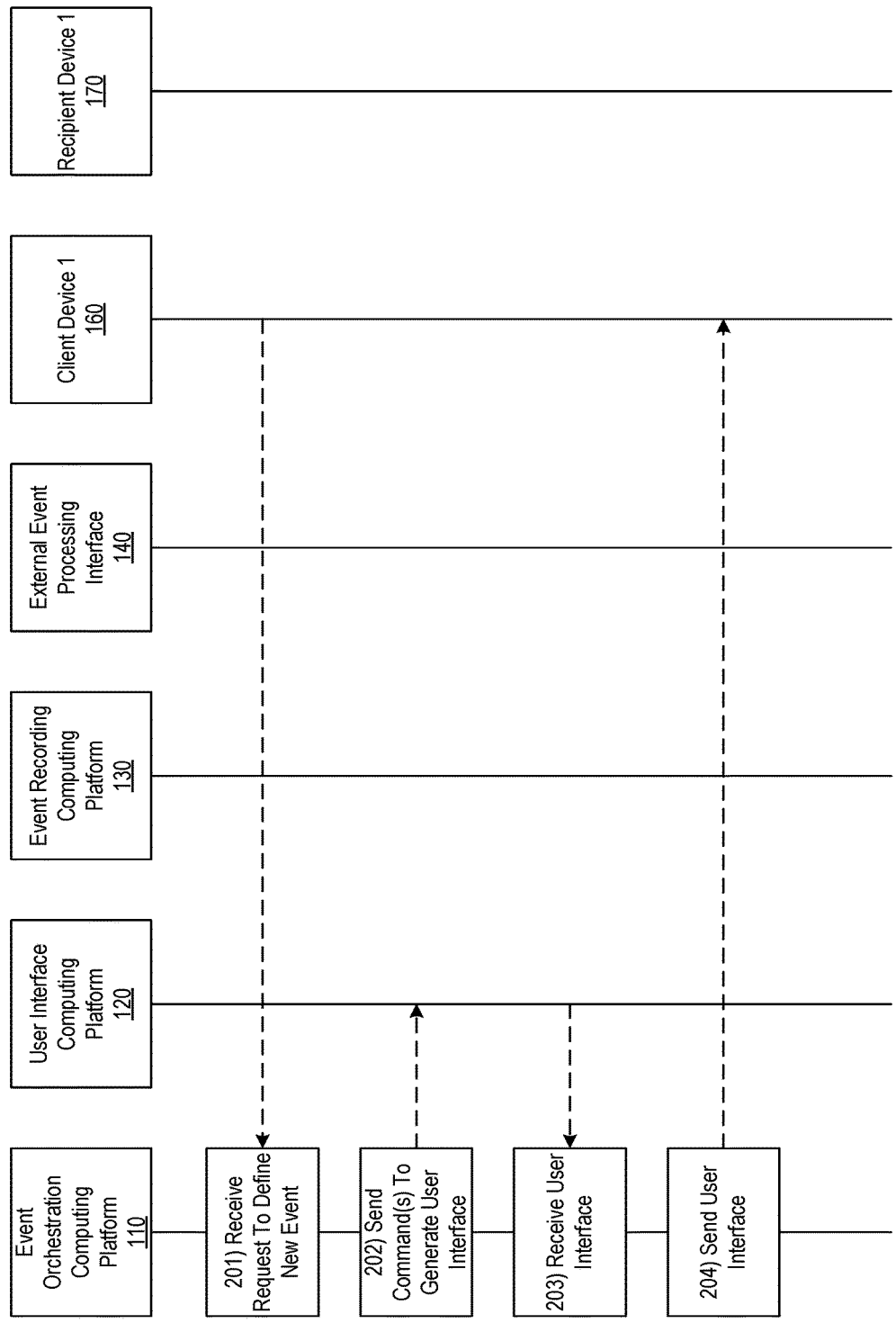
FIGS. 2A-2H depict an illustrative event sequence for multicomputer processing of client device request data with centralized event orchestration in accordance with one or more example embodiments.

FIGS. 2A-2H depict an illustrative event sequence for multicomputer processing of client device request data with centralized event orchestration in accordance with one or more example embodiments. Referring to FIG. 2A, at step 201, event orchestration computing platform 110 may receive a request to define a new event from client computing device 160. For example, at step 201, event orchestration computing platform 110 may receive a message from client computing device 160 requesting an event definition user interface and/or other user interface via which a new event and/or one or more associated event parameters may be defined.

In some instances, the request to define a new event received from client computing device 160 at step 201 may be and/or include a request to define a new payment transaction event, such as a cross-border and/or cross-currency payment transaction event, to be orchestrated by event orchestration computing platform 110. For instance, event orchestration computing platform 110 may be operated by and/or associated with a financial institution, and client computing device 160 may be operated by and/or associated with a treasury client of the financial institution. The treasury client of the financial institution associated with client computing device 160 may, for instance, request to define a new payment transaction event, such as a cross-border and/or cross-currency payment transaction event, that is to be orchestrated by event orchestration computing platform 110 and that may involve a payment by the treasury client of the financial institution to a specific recipient (which may, e.g., be associated with a specific recipient device, such as recipient computing device 170). As illustrated in greater detail below, the treasury client of the financial institution may identify the specific recipient of the new payment transaction event only by an alias, such as an email address, a mobile telephone number, a social networking handle, and/or the like (e.g., rather than identifying the specific recipient of the new payment transaction event by a legal name and/or account number), and event orchestration computing platform 110 may use this alias information to contact the specific recipient of the new payment transaction event and provide them with recipient-selection functionality that allows the specific recipient of the new payment transaction event to select how they would like to receive the funds corresponding to the new payment transaction event (e.g., in a particular digital wallet, bank account, and/or the like). In addition, the new payment transaction event may, in some instances, be a cross-border payment transaction event in which the treasury client of the financial institution and the specific recipient of the new payment transaction may be located in and/or otherwise associated with different countries. Additionally or alternatively, the new payment transaction event may, in some instances, be a cross-currency payment transaction event in which the treasury client of the financial institution may provide funds to the financial institution for payment in a first currency, and in which the specific recipient of the new payment transaction may receive the funds in a second currency different from the first currency.

At step 202, event orchestration computing platform 110 may send one or more commands to user interface computing platform 120 directing user interface computing platform 120 to generate a user interface. For example, at step 202, event orchestration computing platform 110 may generate and/or send one or more commands to user interface computing platform 120 directing user interface computing platform 120 to generate a user interface that is configured to allow a user of client computing device 160 to define a new event, such as a new cross-border and/or cross-currency payment transaction event, to be orchestrated by event orchestration computing platform 110. The one or more commands generated by event orchestration computing platform 110 and/or sent by event orchestration computing platform 110 to user interface computing platform 120 may include parameters and/or other information identifying a client of an organization operating event orchestration computing platform 110 with which the request to define the new event is associated (e.g., the client of the organization linked to and/or otherwise associated with client computing device 160), parameters and/or other information identifying the user interface that is requested, and/or other parameters and information. At step 203, event orchestration computing platform 110 may receive a user interface generated by user interface computing platform 120 from user interface computing platform 120. For example, at step 203, event orchestration computing platform 110 may receive from user interface computing platform 120 a user interface generated by user interface computing platform 120 based on the one or more commands sent to user interface computing platform 120 by event orchestration computing platform 110.

Figure 3:
FIGS. 3-6 depict example graphical user interfaces for multicomputer processing of client device request data with centralized event orchestration in accordance with one or more example embodiments.

At step 204, event orchestration computing platform 110 may send the user interface to client computing device 160. In sending the user interface to client computing device 160, event orchestration computing platform 110 may cause client computing device 160 to display and/or otherwise present the user interface generated by user interface computing platform 120 based on the one or more commands sent to user interface computing platform 120 by event orchestration computing platform 110. For example, in sending the user interface to client computing device 160, event orchestration computing platform 110 may cause client computing device 160 to display and/or otherwise present a graphical user interface similar to graphical user interface 300, which is illustrated in FIG. 3. As seen in FIG. 3, graphical user interface 300 may include one or more fields, controls, and/or other elements that may allow a user of client computing device 160 to define a new event, such as a new cross-border and/or cross-currency payment transaction event, to be orchestrated by event orchestration computing platform 110. For example, graphical user interface 300 may include one or more fields, controls, and/or other elements that may allow a user of client computing device 160 to specify and/or otherwise define an event date parameter associated with the new event, an event type parameter associated with the new event, an event occurrence parameter associated with the new event, an event recipient parameter associated with the new event, and/or other parameters associated with the new event. In addition, and as seen in FIG. 3, graphical user interface 300 may include one or more fields, controls, and/or other elements that may allow a user of client computing device 160 to identify a recipient associated with the event using an alias, such as an email address, a mobile telephone number, a social networking handle, and/or the like (e.g., rather than identifying the recipient of the new event by a legal name and/or account number), and event orchestration computing platform 110 subsequently may use this alias information to contact the specific recipient of the new event and provide them with recipient-selection functionality (which may, e.g., allow the specific recipient of a new payment transaction event to select how they would like to receive the funds corresponding to the new payment transaction event, such as in a particular digital wallet, bank account, and/or the like).

Figure 2B:
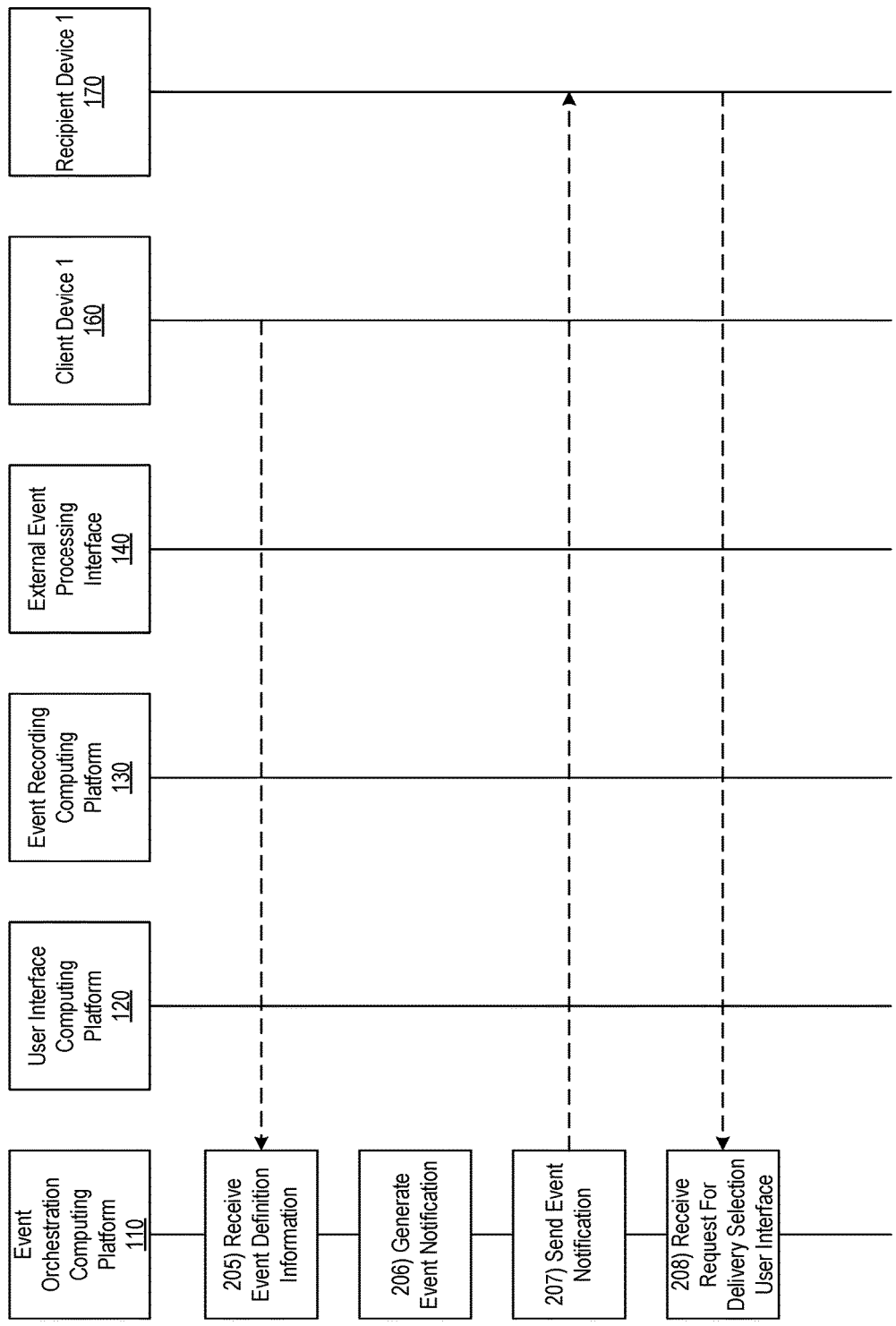

Referring to FIG. 2B, at step 205, event orchestration computing platform 110 may receive event definition information from client computing device 160. For example, at step 205, event orchestration computing platform 110 may receive, via the communication interface (e.g., communication interface 115), from a first client computing device (e.g., client computing device 160), first event definition information defining a first event. For example, event orchestration computing platform 110 may receive, from client computing device 160, first event definition information defining a first event, such as a new cross-border and/or cross-currency payment transaction event, to be orchestrated by event orchestration computing platform 110. The first event definition information defining the first event to be orchestrated by event orchestration computing platform 110 may, for instance, be received via an event definition user interface generated by user interface computing platform 120 and sent to client computing device 160 by event orchestration computing platform 110 (e.g., the user interface sent by event orchestration computing platform 110 to client computing device 160 at step 204).

In some embodiments, receiving the first event definition information defining the first event may include receiving information defining one or more parameters of the first event from the first client computing device. For example, in receiving the first event definition information defining the first event, event orchestration computing platform 110 may receive information defining one or more parameters of the first event from the first client computing device (e.g., client computing device 160). For example, the first event definition information defining the first event to be orchestrated by event orchestration computing platform 110 (which may, e.g., be received by event orchestration computing platform 110 from client computing device 160 at step 205) may include one or more parameters and/or other information specified by a user of client computing device 160. For example, the first event to be orchestrated by event orchestration computing platform 110 may be a payment transaction, and the one or more parameters and/or other information specified by the user of client computing device 160 may identify a recipient of the transaction to be paid, an amount to be paid to the recipient of the transaction, whether the transaction has a single occurrence or multiple occurrences, and/or other characteristics of the transaction.

In some embodiments, the information defining the one or more parameters of the first event may include information defining the first event as a single event having a single occurrence. For example, the information defining the one or more parameters of the first event (which may, e.g., be received by event orchestration computing platform 110 from client computing device 160) may include information defining the first event as a single event having a single occurrence. For instance, the first event may correspond to a new payment transaction involving a single payment to an identified recipient. In some embodiments, the information defining the one or more parameters of the first event may include information defining the first event as a recurring event having multiple occurrences. For example, the information defining the one or more parameters of the first event (which may, e.g., be received by event orchestration computing platform 110 from client computing device 160) may include information defining the first event as a recurring event having multiple occurrences. For instance, the first event may correspond to a new payment transaction involving multiple recurring payments to an identified recipient.

At step 206, event orchestration computing platform 110 may generate an event notification. For example, at step 206, event orchestration computing platform 110 may generate an event notification for recipient computing device 170 based on receiving event definition information from client computing device 160 identifying an alias linked to recipient computing device 170 as a recipient associated with the event defined by the event definition information received from client computing device 160. At step 207, event orchestration computing platform 110 may send the event notification to recipient computing device 170. In sending the event notification to recipient computing device 170, event orchestration computing platform 110 may, for instance, send the event notification to recipient computing device 170 via a push notification service associated with an operating system executing on recipient computing device 170. Additionally or alternatively, in sending the event notification to recipient computing device 170, event orchestration computing platform 110 may send an electronic mail message, a short message service message, and/or another type of electronic message to recipient computing device 170.

At step 208, event orchestration computing platform 110 may receive a request for a delivery selection user interface from recipient computing device 170. For example, at step 208, event orchestration computing platform 110 may receive, via the communication interface (e.g., communication interface 115), from a first recipient computing device associated with the first event (e.g., recipient computing device 170), a request for a first delivery selection user interface. For instance, event orchestration computing platform 110 may receive such a request after recipient computing device 170 sends the request in response to receiving a selection or other user input in response to presenting the event notification received from event orchestration computing platform 110.

In some embodiments, the first recipient computing device associated with the first event may be linked to a first alias identified as a recipient in the first event definition information. For example, the first recipient computing device associated with the first event (e.g., recipient computing device 170) may be linked to a first alias identified as a recipient in the first event definition information (which may, e.g., be received by event orchestration computing platform 110 from client computing device 160). In some instances, the first alias identified as the recipient in the first event definition information (which may, e.g., be received by event orchestration computing platform 110 from client computing device 160) may include an email address. For example, the first alias identified as the recipient in the first event definition information received by event orchestration computing platform 110 from client computing device 160 may include an email address that is linked to, registered with, and/or otherwise associated with the first recipient computing device associated with the first event (e.g., recipient computing device 170) as an alias of the first recipient computing device associated with the first event (e.g., recipient computing device 170). Additionally or alternatively, the first alias identified as the recipient in the first event definition information (which may, e.g., be received by event orchestration computing platform 110 from client computing device 160) may include a mobile telephone number. For example, the first alias identified as the recipient in the first event definition information received by event orchestration computing platform 110 from client computing device 160 may include a mobile telephone number that is linked to, registered with, and/or otherwise associated with the first recipient computing device associated with the first event (e.g., recipient computing device 170) as an alias of the first recipient computing device associated with the first event (e.g., recipient computing device 170).

Figure 2C:
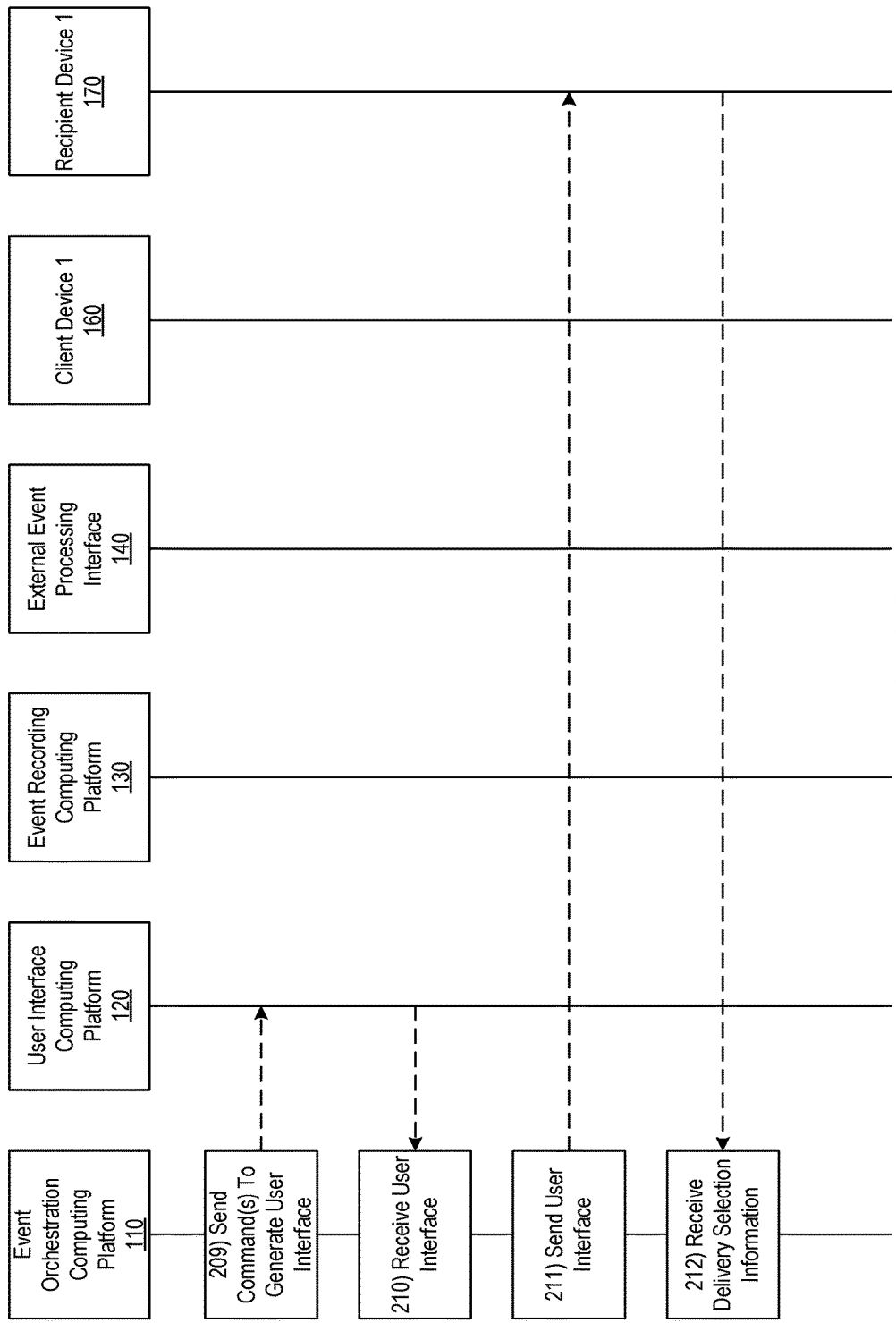

Referring to FIG. 2C, at step 209, event orchestration computing platform 110 may send one or more commands to user interface computing platform 120 directing user interface computing platform 120 to generate a delivery selection user interface (e.g., in response to receiving the request for the delivery selection user interface from recipient computing device 170 at step 208). For example, at step 209, event orchestration computing platform 110 may send, via the communication interface (e.g., communication interface 115), to a user interface computing platform (e.g., user interface computing platform 120), one or more commands directing the user interface computing platform (e.g., user interface computing platform 120) to generate the first delivery selection user interface. The one or more commands generated by event orchestration computing platform 110 and/or sent by event orchestration computing platform 110 to user interface computing platform 120 may include parameters and/or other information identifying the first recipient computing device associated with the first event (e.g., recipient computing device 170) and/or the entity identified as the recipient for the first event (e.g., a registered and/or authorized user of recipient computing device 170), parameters and/or other information identifying the user interface that is requested, and/or other parameters and information.

At step 210, event orchestration computing platform 110 may receive a delivery selection user interface generated by user interface computing platform 120 from user interface computing platform 120. For example, at step 210, event orchestration computing platform 110 may receive, via the communication interface (e.g., communication interface 115), from the user interface computing platform (e.g., user interface computing platform 120), the first delivery selection user interface. For instance, at step 210, event orchestration computing platform 110 may receive from user interface computing platform 120 a user interface generated by user interface computing platform 120 based on the one or more commands sent to user interface computing platform 120 by event orchestration computing platform 110.

Figure 4:
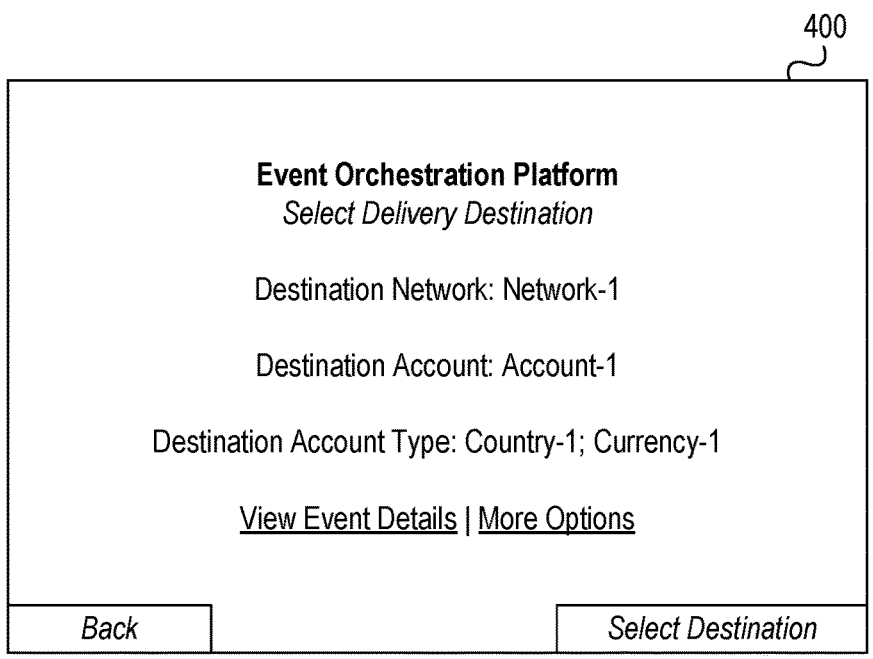

At step 211, event orchestration computing platform 110 may send the delivery selection user interface generated by user interface computing platform 120 to recipient computing device 170. For example, at step 211, event orchestration computing platform 110 may send, via the communication interface (e.g., communication interface 115), to the first recipient computing device associated with the first event (e.g., recipient computing device 170), the first delivery selection user interface. In sending the first delivery selection user interface to the first recipient computing device associated with the first event (e.g., recipient computing device 170), event orchestration computing platform 110 may cause recipient computing device 170 to display and/or otherwise present the user interface generated by user interface computing platform 120 based on the one or more commands sent to user interface computing platform 120 by event orchestration computing platform 110. For example, in sending the first delivery selection user interface to the first recipient computing device associated with the first event (e.g., recipient computing device 170), event orchestration computing platform 110 may cause recipient computing device 170 to display and/or otherwise present a graphical user interface similar to graphical user interface 400, which is illustrated in FIG. 4. As seen in FIG. 4, graphical user interface 400 may include one or more fields, controls, and/or other elements that may allow a user of recipient computing device 170 to select and/or specify a delivery destination for the first event, such as a delivery destination for funds associated with a cross-border and/or cross-currency payment transaction event being orchestrated by event orchestration computing platform 110. For example, graphical user interface 400 may include one or more fields, controls, and/or other elements that may allow a user of recipient computing device 170 to specify and/or otherwise define a destination network parameter associated with the event, a destination account parameter associated with the event, a destination account type parameter associated with the event (which may, e.g., indicate a destination country and/or a destination country for a cross-border and/or cross-currency payment transaction event), and/or other parameters associated with the new event.

In some embodiments, the first delivery selection user interface may include a first user-selectable control element that, when invoked by the user of the first recipient computing device associated with the first event, causes the first recipient computing device associated with the first event to generate the first delivery selection information identifying the first destination for the first event. For example, the first delivery selection user interface (which may, e.g., be generated by user interface computing platform 120 and sent by event orchestration computing platform 110 to recipient computing device 170) may include a first user-selectable control element (e.g., the "Select Destination" button illustrated in FIG. 4) that, when invoked by the user of the first recipient computing device associated with the first event (e.g., recipient computing device 170), causes the first recipient computing device associated with the first event (e.g., recipient computing device 170) to generate the first delivery selection information identifying the first destination for the first event (e.g., based on the one or more selections made by the user of recipient computing device 170 via the delivery selection user interface, such as the example selections illustrated in FIG. 4).

At step 212, event orchestration computing platform 110 may receive delivery selection information from recipient computing device 170. For example, at step 212, event orchestration computing platform 110 may receive, via the communication interface (e.g., communication interface 115), from the first recipient computing device associated with the first event (e.g., recipient computing device 170), first delivery selection information identifying a first destination for the first event selected by a user of the first recipient computing device associated with the first event (e.g., recipient computing device 170). For instance, the first destination for the first event, which may be selected by a user of the first recipient computing device associated with the first event (e.g., recipient computing device 170), may be a particular digital wallet used by the user of the first recipient computing device associated with the first event (e.g., recipient computing device 170), a particular banking account used by the user of the first recipient computing device associated with the first event (e.g., recipient computing device 170), or the like. In some instances, the first destination for the first event, which may be selected by a user of the first recipient computing device associated with the first event (e.g., recipient computing device 170), may be a foreign, cross-border banking account or digital wallet account that is maintained in a different country (e.g., relative to the organization operating event orchestration computing platform 110 and/or the client associated with client computing device 160). Additionally or alternatively, the first destination for the first event, which may be selected by a user of the first recipient computing device associated with the first event (e.g., recipient computing device 170), may be a foreign, cross-currency banking account or digital wallet account than is maintained in a different currency (e.g., relative to a standard and/or national currency used by the organization operating event orchestration computing platform 110 and/or the client associated with client computing device 160).

Figure 2D:
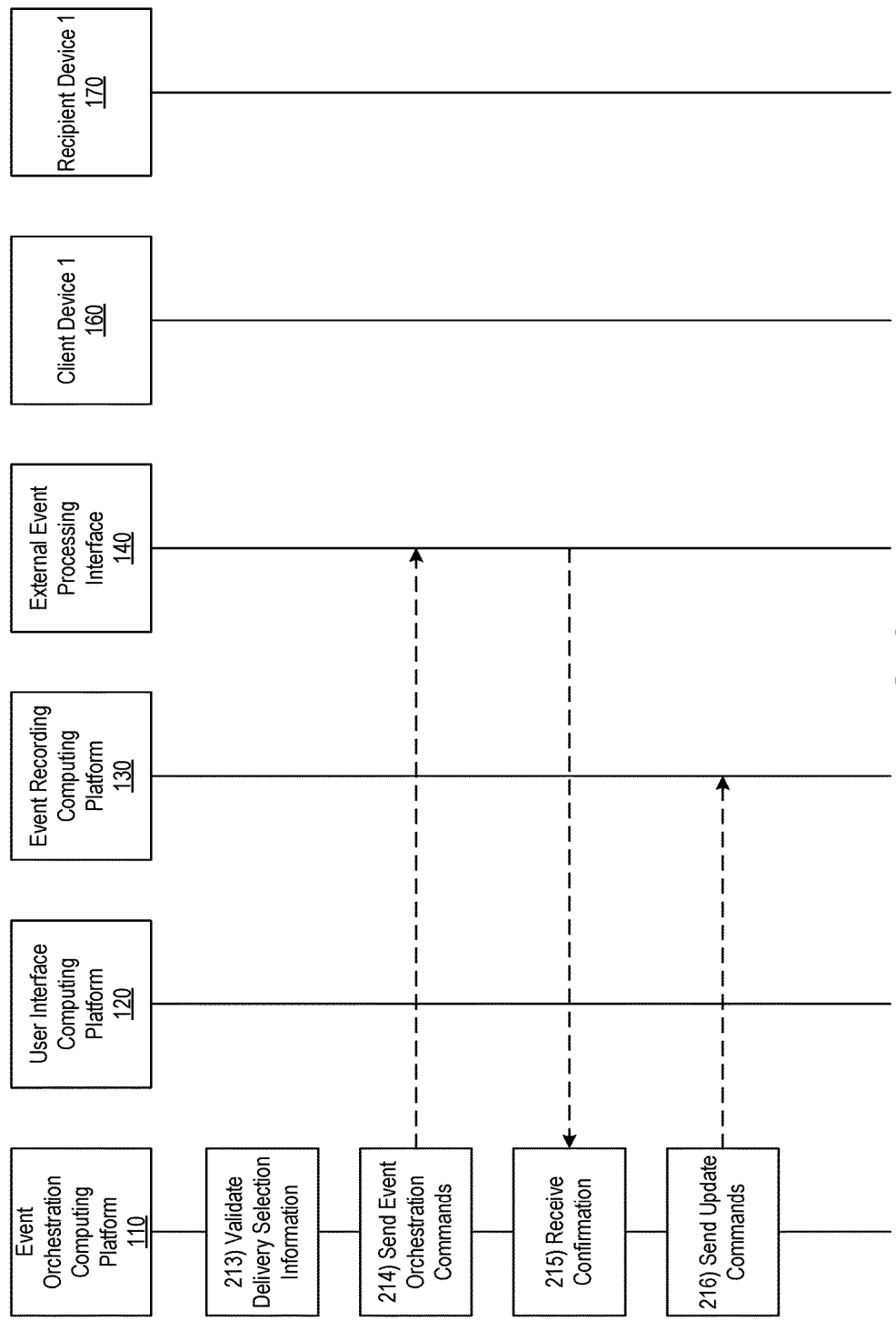

Referring to FIG. 2D, at step 213, event orchestration computing platform 110 may validate the delivery selection information received from recipient computing device 170. For example, at step 213, event orchestration computing platform 110 may validate the first delivery selection information identifying the first destination for the first event received from the first recipient computing device associated with the first event (e.g., recipient computing device 170). In validating the first delivery selection information identifying the first destination for the first event received from the first recipient computing device associated with the first event (e.g., recipient computing device 170), event orchestration computing platform 110 may, for example, execute and/or apply one or more risk analysis evaluation algorithms, regulatory compliance evaluation algorithms, account verification evaluation algorithms, identity verification evaluation algorithms, and/or other algorithms to determine whether the first delivery selection information identifying the first destination for the first event received from the first recipient computing device associated with the first event (e.g., recipient computing device 170) is valid. If event orchestration computing platform 110 determines that the first delivery selection information identifying the first destination for the first event received from the first recipient computing device associated with the first event (e.g., recipient computing device 170) is invalid, event orchestration computing platform 110 may generate and/or send one or more error messages (e.g., to event recording computing platform 130, client computing device 160, recipient computing device 170, and/or one or more other systems and/or devices). Alternatively, if event orchestration computing platform 110 determines that the first delivery selection information identifying the first destination for the first event received from the first recipient computing device associated with the first event (e.g., recipient computing device 170) is valid, the event sequence may continue to step 214 as illustrated in FIG. 2D.

At step 214, event orchestration computing platform 110 may send one or more event orchestration commands to external event processing interface 140. For example, at step 214, event orchestration computing platform 110 may generate, based on the first delivery selection information identifying the first destination for the first event received from the first recipient computing device associated with the first event (e.g., recipient computing device 170), one or more first event orchestration commands directing a first external event processor (e.g., external event processor 150) to execute one or more actions associated with the first event. For instance, event orchestration computing platform 110 may generate one or more commands directing and/or controlling external event processor 150 to execute one or more actions associated with the first event, such as one or more actions that perform and/or complete a payment transaction corresponding to the first event. For example, the one or more commands generated by event orchestration computing platform 110 may direct the first external event processor (e.g., external event processor 150) (which may, e.g., be associated with a particular digital wallet service, banking service, or the like) to transfer funds to the first destination selected by the user of the first recipient computing device associated with the first event (e.g., recipient computing device 170). In addition, at step 214, event orchestration computing platform 110 may send, via the communication interface (e.g., communication interface 115) and via an external event processing interface (e.g., external event processing interface 140), to the first external event processor (e.g., external event processor 150), the one or more first event orchestration commands directing the first external event processor (e.g., external event processor 150) to execute the one or more actions associated with the first event. In some instances, event orchestration computing platform 110 may send one or more orchestration commands directly to the first external event processor (e.g., external event processor 150) in addition to and/or instead of sending such commands via the external event processing interface (e.g., external event processing interface 140).

At step 215, event orchestration computing platform 110 may receive confirmation information from external event processing interface 140. For example, at step 215, event orchestration computing platform 110 may receive from external event processing interface 140 confirmation information indicating that one or more actions associated with the first event were performed and/or completed by one or more external event servers (e.g., external event processor 150) to which external event processing interface 140 is connected. At step 216, event orchestration computing platform 110 may send one or more update commands to event recording computing platform 130. For example, at step 216, event orchestration computing platform 110 may send one or more update commands to event recording computing platform 130 directing event recording computing platform 130 to update one or more records indicating that the first event has been completed and/or that one or more actions associated with the first event have been performed based on the one or more event orchestration commands sent to external event processing interface 140 by event orchestration computing platform 110 and/or based on the confirmation information received by event orchestration computing platform 110 from external event processing interface 140.

By processing client device request data using multicomputer processing and centralized event orchestration (e.g., by implementing the techniques and/or performing the steps described above), event orchestration computing platform 110 may provide improved information security and enhanced technical performance (e.g., when processing one or more events defined by a client computing device, such as client computing device 160, and involving a particular recipient computing device, such as recipient computing device 170). Subsequently, event orchestration computing platform 110 may execute one or more actions, similar to those discussed above, in processing one or more additional events, such as a second event involving client computing device 165 and recipient computing device 175, as illustrated in the example event sequence.

Figure 2E:
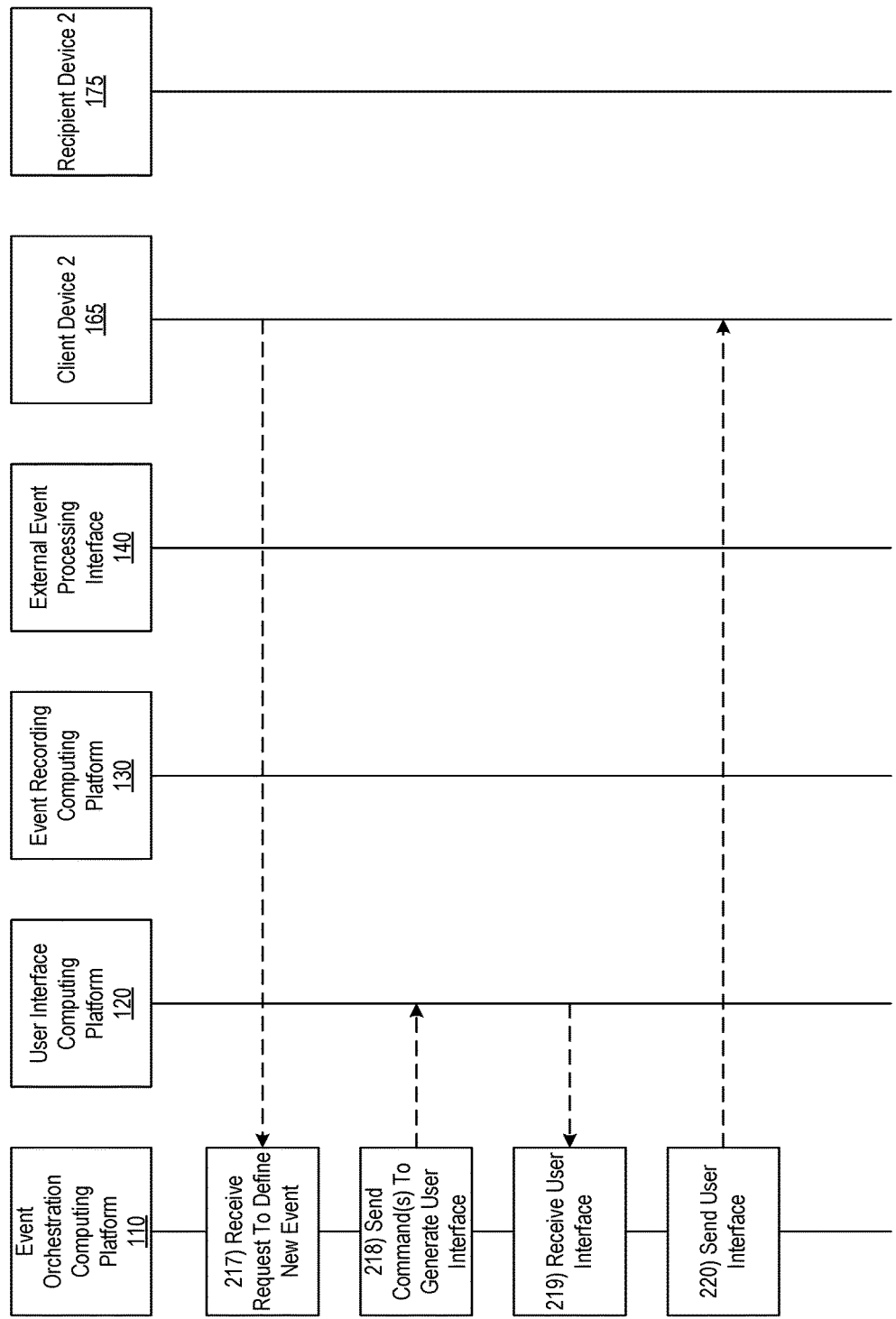

Referring to FIG. 2E, at step 217, event orchestration computing platform 110 may receive a request to define a new event from client computing device 165. For example, at step 217, event orchestration computing platform 110 may receive a message from client computing device 165 requesting an event definition user interface and/or other user interface via which another new event and/or one or more associated event parameters may be defined.

In some instances, the request to define a new event received from client computing device 165 at step 217 may be and/or include a request to define another new payment transaction event, such as another cross-border and/or cross-currency payment transaction event, to be orchestrated by event orchestration computing platform 110. For instance, client computing device 165 may be operated by and/or associated with another treasury client of the financial institution operating event orchestration computing platform 110. The treasury client of the financial institution associated with client computing device 165 may, for instance, request to define a new payment transaction event, such as a cross-border and/or cross-currency payment transaction event, that is to be orchestrated by event orchestration computing platform 110 and that may involve a payment by the treasury client of the financial institution to a specific recipient (which may, e.g., be associated with a specific recipient device, such as recipient computing device 175). As illustrated in greater detail below, the treasury client of the financial institution may identify the specific recipient of the new payment transaction event only by an alias, such as an email address, a mobile telephone number, a social networking handle, and/or the like (e.g., rather than identifying the specific recipient of the new payment transaction event by a legal name and/or account number), and event orchestration computing platform 110 may use this alias information to contact the specific recipient of the new payment transaction event and provide them with recipient-selection functionality that allows the specific recipient of the new payment transaction event to select how they would like to receive the funds corresponding to the new payment transaction event (e.g., in a particular digital wallet, bank account, and/or the like). In addition, the new payment transaction event may, in some instances, be a cross-border payment transaction event in which the treasury client of the financial institution and the specific recipient of the new payment transaction may be located in and/or otherwise associated with different countries. Additionally or alternatively, the new payment transaction event may, in some instances, be a cross-currency payment transaction event in which the treasury client of the financial institution may provide funds to the financial institution for payment in a first currency, and in which the specific recipient of the new payment transaction may receive the funds in a second currency different from the first currency.

At step 218, event orchestration computing platform 110 may send one or more commands to user interface computing platform 120 directing user interface computing platform 120 to generate a user interface. For example, at step 218, event orchestration computing platform 110 may generate and/or send one or more commands to user interface computing platform 120 directing user interface computing platform 120 to generate a user interface that is configured to allow a user of client computing device 165 to define a new event, such as a new cross-border and/or cross-currency payment transaction event, to be orchestrated by event orchestration computing platform 110. The one or more commands generated by event orchestration computing platform 110 and/or sent by event orchestration computing platform 110 to user interface computing platform 120 may include parameters and/or other information identifying a client of an organization operating event orchestration computing platform 110 with which the request to define the new event is associated (e.g., the client of the organization linked to and/or otherwise associated with client computing device 165), parameters and/or other information identifying the user interface that is requested, and/or other parameters and information. At step 219, event orchestration computing platform 110 may receive a user interface generated by user interface computing platform 120 from user interface computing platform 120. For example, at step 219, event orchestration computing platform 110 may receive from user interface computing platform 120 a user interface generated by user interface computing platform 120 based on the one or more commands sent to user interface computing platform 120 by event orchestration computing platform 110.

Figure 5:
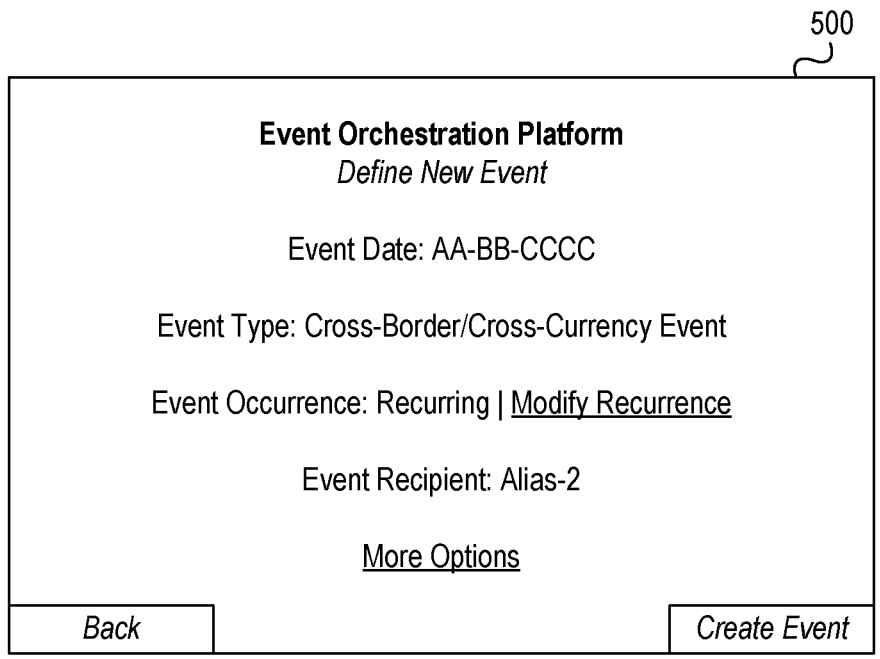

At step 220, event orchestration computing platform 110 may send the user interface to client computing device 165. In sending the user interface to client computing device 165, event orchestration computing platform 110 may cause client computing device 165 to display and/or otherwise present the user interface generated by user interface computing platform 120 based on the one or more commands sent to user interface computing platform 120 by event orchestration computing platform 110. For example, in sending the user interface to client computing device 165, event orchestration computing platform 110 may cause client computing device 165 to display and/or otherwise present a graphical user interface similar to graphical user interface 500, which is illustrated in FIG. 5. As seen in FIG. 5, graphical user interface 500 may include one or more fields, controls, and/or other elements that may allow a user of client computing device 165 to define a new event, such as a new cross-border and/or cross-currency payment transaction event, to be orchestrated by event orchestration computing platform 110. For example, graphical user interface 500 may include one or more fields, controls, and/or other elements that may allow a user of client computing device 165 to specify and/or otherwise define an event date parameter associated with the new event, an event type parameter associated with the new event, an event occurrence parameter associated with the new event, an event recipient parameter associated with the new event, and/or other parameters associated with the new event. In addition, and as seen in FIG. 5, graphical user interface 500 may include one or more fields, controls, and/or other elements that may allow a user of client computing device 165 to identify a recipient associated with the event using an alias, such as an email address, a mobile telephone number, a social networking handle, and/or the like (e.g., rather than identifying the recipient of the new event by a legal name and/or account number), and event orchestration computing platform 110 subsequently may use this alias information to contact the specific recipient of the new event and provide them with recipient-selection functionality (which may, e.g., allow the specific recipient of a new payment transaction event to select how they would like to receive the funds corresponding to the new payment transaction event, such as in a particular digital wallet, bank account, and/or the like).

Figure 2F:
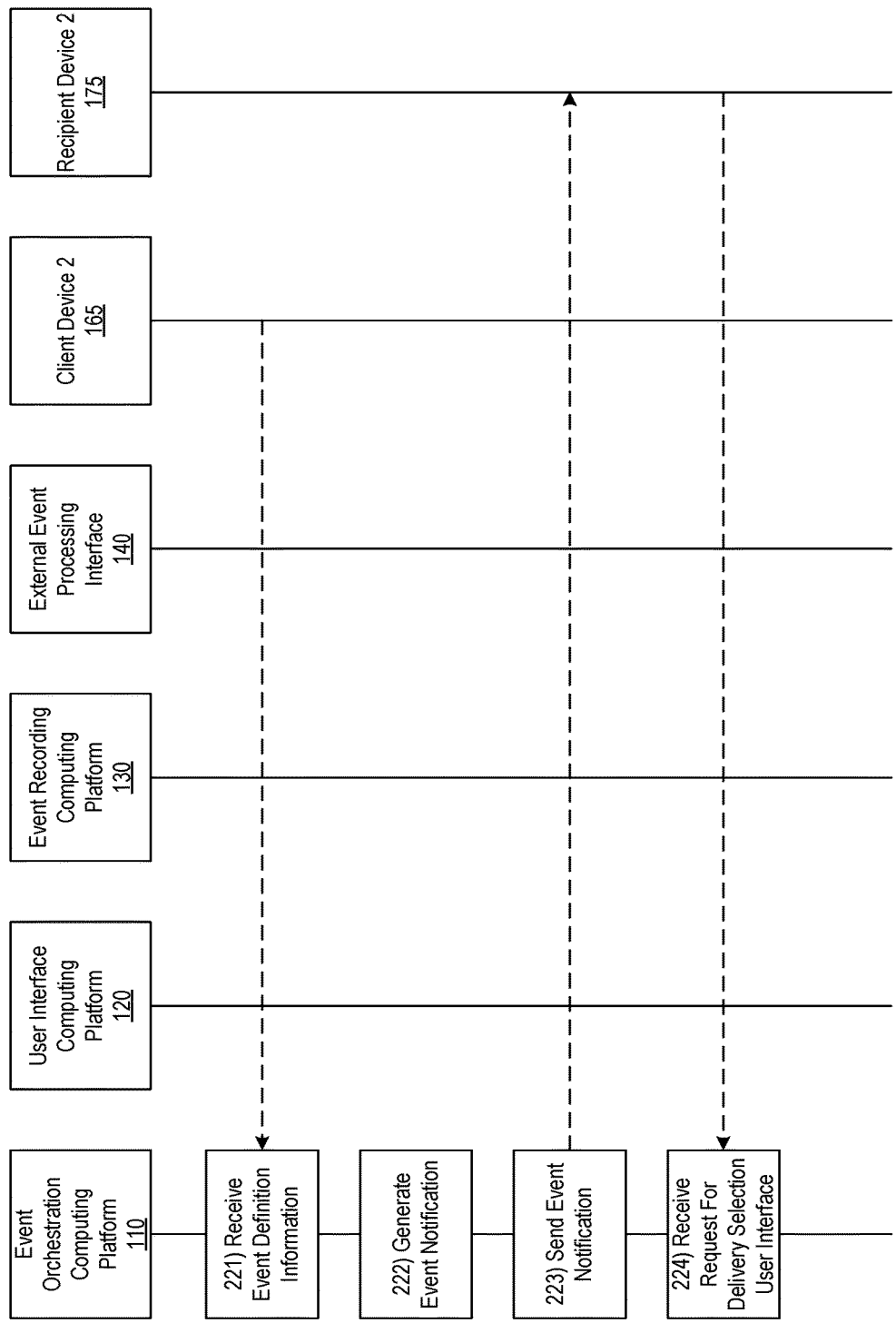

Referring to FIG. 2F, at step 221, event orchestration computing platform 110 may receive event definition information from client computing device 165. For example, at step 221, event orchestration computing platform 110 may receive, via the communication interface (e.g., communication interface 115), from a second client computing device (e.g., client computing device 165), second event definition information defining a second event. For example, event orchestration computing platform 110 may receive from client computing device 165 second event definition information defining a second event, such as a new cross-border and/or cross-currency payment transaction event, to be orchestrated by event orchestration computing platform 110. The second event definition information defining the second event to be orchestrated by event orchestration computing platform 110 may, for instance, be received via an event definition user interface generated by user interface computing platform 120 and sent to client computing device 165 by event orchestration computing platform 110 (e.g., the user interface sent by event orchestration computing platform 110 to client computing device 165 at step 220).

In some embodiments, receiving the second event definition information defining the second event may include receiving information defining one or more parameters of the second event from the second client computing device. For example, in receiving the second event definition information defining the second event, event orchestration computing platform 110 may receive information defining one or more parameters of the second event from the second client computing device (e.g., client computing device 165). For example, the second event definition information defining the second event to be orchestrated by event orchestration computing platform 110 (which may, e.g., be received by event orchestration computing platform 110 from client computing device 165 at step 221) may include one or more parameters and/or other information specified by a user of client computing device 165. For example, the second event to be orchestrated by event orchestration computing platform 110 may be a payment transaction, and the one or more parameters and/or other information specified by the user of client computing device 165 may identify a recipient of the transaction to be paid, an amount to be paid to the recipient of the transaction, whether the transaction has a single occurrence or multiple occurrences, and/or other characteristics of the transaction.

In some embodiments, the information defining the one or more parameters of the second event may include information defining the second event as a single event having a single occurrence. For example, the information defining the one or more parameters of the second event (which may, e.g., be received by event orchestration computing platform 110 from client computing device 165) may include information defining the second event as a single event having a single occurrence. For instance, the second event may correspond to a new payment transaction involving a single payment to an identified recipient. In some embodiments, the information defining the one or more parameters of the second event may include information defining the second event as a recurring event having multiple occurrences. For example, the information defining the one or more parameters of the second event (which may, e.g., be received by event orchestration computing platform 110 from client computing device 165) may include information defining the second event as a recurring event having multiple occurrences. For instance, the second event may correspond to a new payment transaction involving multiple recurring payments to an identified recipient.

At step 222, event orchestration computing platform 110 may generate an event notification. For example, at step 222, event orchestration computing platform 110 may generate an event notification for recipient computing device 175 based on receiving event definition information from client computing device 165 identifying an alias linked to recipient computing device 175 as a recipient associated with the event defined by the event definition information received from client computing device 165. At step 223, event orchestration computing platform 110 may send the event notification to recipient computing device 175. In sending the event notification to recipient computing device 175, event orchestration computing platform 110 may, for instance, send the event notification to recipient computing device 175 via a push notification service associated with an operating system executing on recipient computing device 175. Additionally or alternatively, in sending the event notification to recipient computing device 175, event orchestration computing platform 110 may send an electronic mail message, a short message service message, and/or another type of electronic message to recipient computing device 175.

At step 224, event orchestration computing platform 110 may receive a request for a delivery selection user interface from recipient computing device 175. For example, at step 224, event orchestration computing platform 110 may receive, via the communication interface (e.g., communication interface 115), from a second recipient computing device associated with the second event (e.g., recipient computing device 175), a request for a second delivery selection user interface. For instance, event orchestration computing platform 110 may receive such a request after recipient computing device 175 sends the request in response to receiving a selection or other user input in response to presenting the event notification received from event orchestration computing platform 110.

In some embodiments, the second recipient computing device associated with the second event may be linked to a second alias identified as a recipient in the second event definition information. For example, the second recipient computing device associated with the second event (e.g., recipient computing device 175) may be linked to a second alias identified as a recipient in the second event definition information (which may, e.g., be received by event orchestration computing platform 110 from client computing device 165). In some instances, the second alias identified as the recipient in the second event definition information (which may, e.g., be received by event orchestration computing platform 110 from client computing device 165) may include an email address. For example, the second alias identified as the recipient in the second event definition information received by event orchestration computing platform 110 from client computing device 165 may include an email address that is linked to, registered with, and/or otherwise associated with the second recipient computing device associated with the second event (e.g., recipient computing device 175) as an alias of the second recipient computing device associated with the second event (e.g., recipient computing device 175). Additionally or alternatively, the second alias identified as the recipient in the second event definition information (which may, e.g., be received by event orchestration computing platform 110 from client computing device 165) may include a mobile telephone number. For example, the second alias identified as the recipient in the second event definition information received by event orchestration computing platform 110 from client computing device 165 may include a mobile telephone number that is linked to, registered with, and/or otherwise associated with the second recipient computing device associated with the second event (e.g., recipient computing device 175) as an alias of the second recipient computing device associated with the second event (e.g., recipient computing device 175).

Figure 2G:
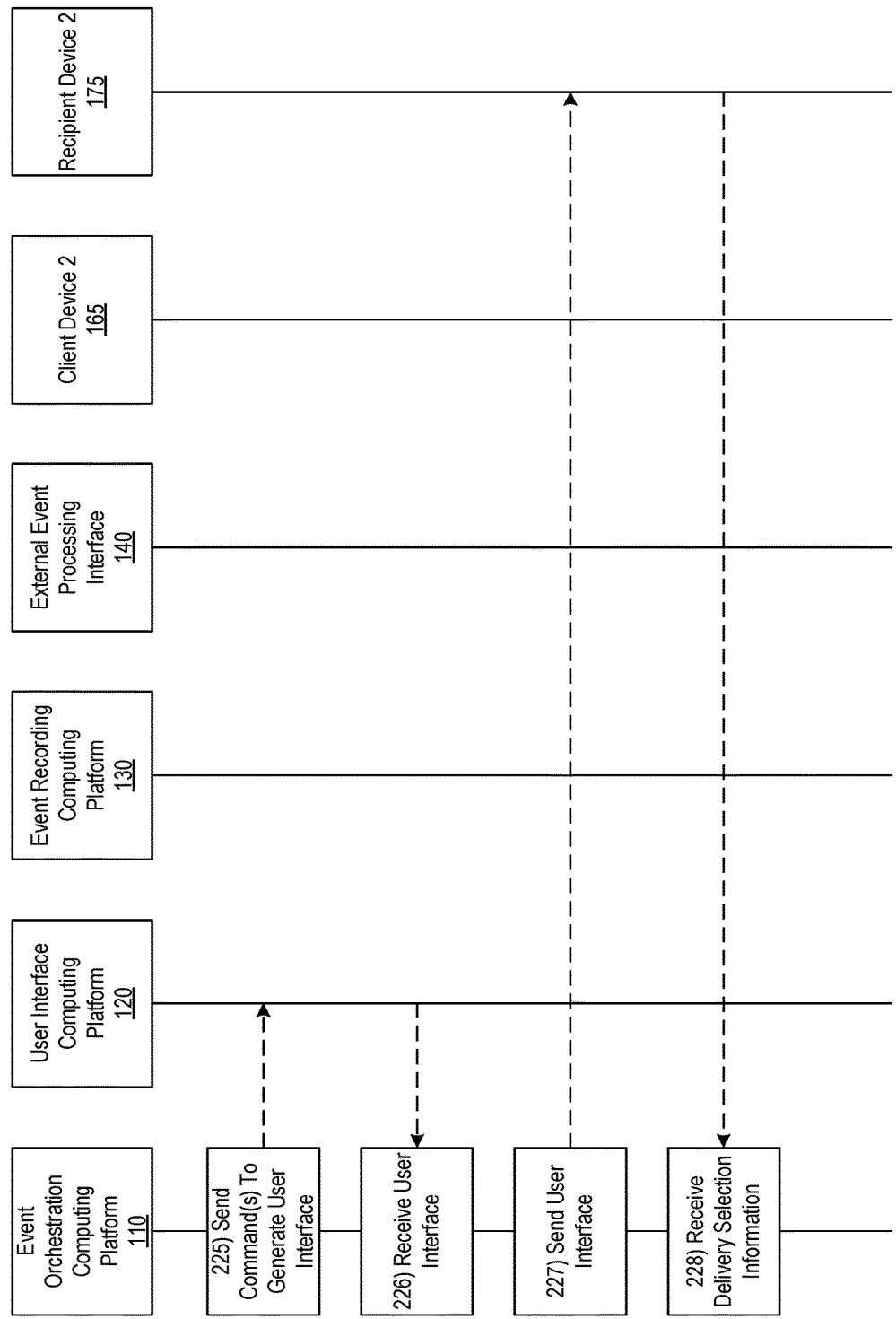

Referring to FIG. 2G, at step 225, event orchestration computing platform 110 may send one or more commands to user interface computing platform 120 directing user interface computing platform 120 to generate a delivery selection user interface (e.g., in response to receiving the request for the delivery selection user interface from recipient computing device 175 at step 224). For example, at step 225, event orchestration computing platform 110 may send, via the communication interface (e.g., communication interface 115), to a user interface computing platform (e.g., user interface computing platform 120), one or more commands directing the user interface computing platform (e.g., user interface computing platform 120) to generate the second delivery selection user interface. The one or more commands generated by event orchestration computing platform 110 and/or sent by event orchestration computing platform 110 to user interface computing platform 120 may include parameters and/or other information identifying the second recipient computing device associated with the second event (e.g., recipient computing device 175) and/or the entity identified as the recipient for the second event (e.g., a registered and/or authorized user of recipient computing device 175), parameters and/or other information identifying the user interface that is requested, and/or other parameters and information.

At step 226, event orchestration computing platform 110 may receive a delivery selection user interface generated by user interface computing platform 120 from user interface computing platform 120. For example, at step 226, event orchestration computing platform 110 may receive, via the communication interface (e.g., communication interface 115), from the user interface computing platform (e.g., user interface computing platform 120), the second delivery selection user interface. For instance, at step 226, event orchestration computing platform 110 may receive from user interface computing platform 120 a user interface generated by user interface computing platform 120 based on the one or more commands sent to user interface computing platform 120 by event orchestration computing platform 110.

Figure 6:
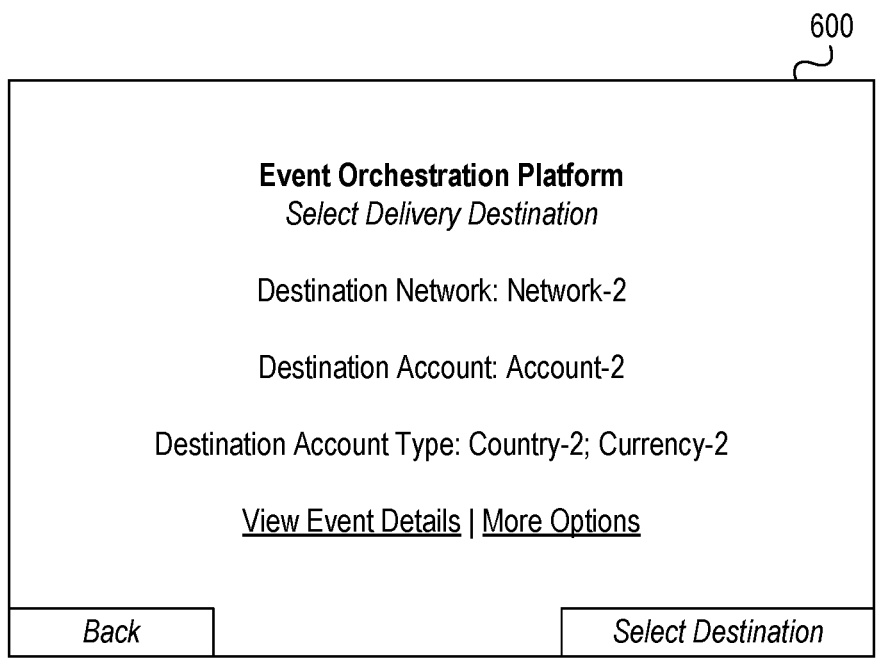

At step 227, event orchestration computing platform 110 may send the delivery selection user interface generated by user interface computing platform 120 to recipient computing device 175. For example, at step 227, event orchestration computing platform 110 may send, via the communication interface (e.g., communication interface 115), to the second recipient computing device associated with the second event (e.g., recipient computing device 175), the second delivery selection user interface. In sending the second delivery selection user interface to the second recipient computing device associated with the second event (e.g., recipient computing device 175), event orchestration computing platform 110 may cause recipient computing device 175 to display and/or otherwise present the user interface generated by user interface computing platform 120 based on the one or more commands sent to user interface computing platform 120 by event orchestration computing platform 110. For example, in sending the second delivery selection user interface to the second recipient computing device associated with the second event (e.g., recipient computing device 175), event orchestration computing platform 110 may cause recipient computing device 175 to display and/or otherwise present a graphical user interface similar to graphical user interface 600, which is illustrated in FIG. 6. As seen in FIG. 6, graphical user interface 600 may include one or more fields, controls, and/or other elements that may allow a user of recipient computing device 175 to select and/or specify a delivery destination for the second event, such as a delivery destination for funds associated with a cross-border and/or cross-currency payment transaction event being orchestrated by event orchestration computing platform 110. For example, graphical user interface 600 may include one or more fields, controls, and/or other elements that may allow a user of recipient computing device 175 to specify and/or otherwise define a destination network parameter associated with the event, a destination account parameter associated with the event, a destination account type parameter associated with the event (which may, e.g., indicate a destination country and/or a destination country for a cross-border and/or cross-currency payment transaction event), and/or other parameters associated with the new event.

In some embodiments, the second delivery selection user interface may include a second user-selectable control element that, when invoked by the user of the second recipient computing device associated with the second event, causes the second recipient computing device associated with the second event to generate the second delivery selection information identifying the second destination for the second event. For example, the second delivery selection user interface (which may, e.g., be generated by user interface computing platform 120 and sent by event orchestration computing platform 110 to recipient computing device 175) may include a second user-selectable control element (e.g., the "Select Destination" button illustrated in FIG. 6) that, when invoked by the user of the second recipient computing device associated with the second event (e.g., recipient computing device 175), causes the second recipient computing device associated with the second event (e.g., recipient computing device 175) to generate the second delivery selection information identifying the second destination for the second event (e.g., based on the one or more selections made by the user of recipient computing device 175 via the delivery selection user interface, such as the example selections illustrated in FIG. 6).

At step 228, event orchestration computing platform 110 may receive delivery selection information from recipient computing device 175. For example, at step 228, event orchestration computing platform 110 may receive, via the communication interface (e.g., communication interface 115), from the second recipient computing device associated with the second event (e.g., recipient computing device 175), second delivery selection information identifying a second destination for the second event selected by a user of the second recipient computing device associated with the second event (e.g., recipient computing device 175). For instance, the second destination for the second event, which may be selected by a user of the second recipient computing device associated with the second event (e.g., recipient computing device 175), may be a particular digital wallet used by the user of the second recipient computing device associated with the second event (e.g., recipient computing device 175), a particular banking account used by the user of the second recipient computing device associated with the second event (e.g., recipient computing device 175), or the like. In some instances, the second destination for the second event, which may be selected by a user of the second recipient computing device associated with the second event (e.g., recipient computing device 175), may be a foreign, cross-border banking account or digital wallet account that is maintained in a different country (e.g., relative to the organization operating event orchestration computing platform 110 and/or the client associated with client computing device 165). Additionally or alternatively, the second destination for the second event, which may be selected by a user of the second recipient computing device associated with the second event (e.g., recipient computing device 175), may be a foreign, cross-currency banking account or digital wallet account than is maintained in a different currency (e.g., relative to a standard and/or national currency used by the organization operating event orchestration computing platform 110 and/or the client associated with client computing device 165).

Figure 2H:
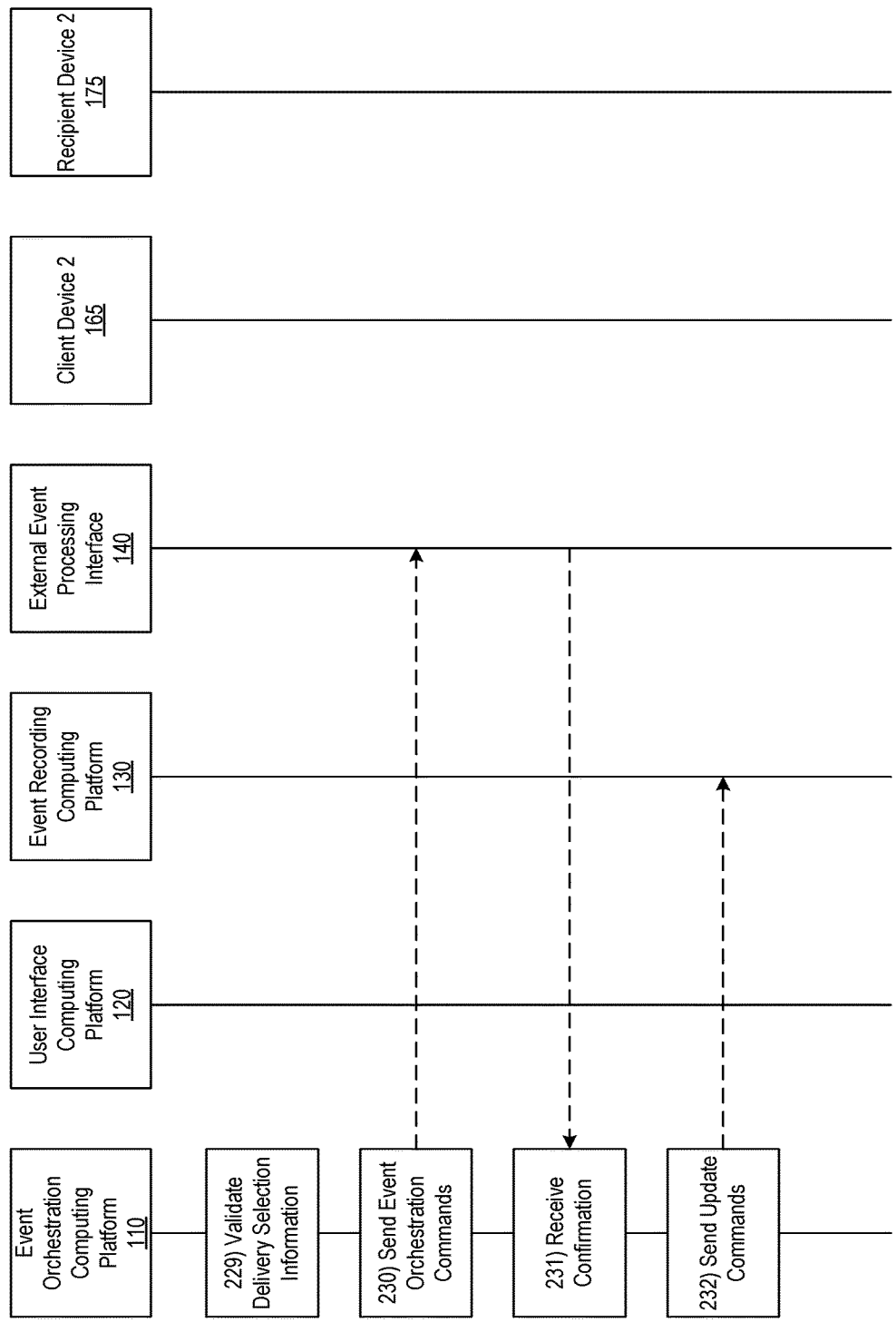

Referring to FIG. 2H, at step 229, event orchestration computing platform 110 may validate the delivery selection information received from recipient computing device 175. For example, at step 229, event orchestration computing platform 110 may validate the second delivery selection information identifying the second destination for the second event received from the second recipient computing device associated with the second event (e.g., recipient computing device 175). In validating the second delivery selection information identifying the second destination for the second event received from the second recipient computing device associated with the second event (e.g., recipient computing device 175), event orchestration computing platform 110 may, for example, execute and/or apply one or more risk analysis evaluation algorithms, regulatory compliance evaluation algorithms, account verification evaluation algorithms, identity verification evaluation algorithms, and/or other algorithms to determine whether the second delivery selection information identifying the second destination for the second event received from the second recipient computing device associated with the second event (e.g., recipient computing device 175) is valid. If event orchestration computing platform 110 determines that the second delivery selection information identifying the second destination for the second event received from the second recipient computing device associated with the second event (e.g., recipient computing device 175) is invalid, event orchestration computing platform 110 may generate and/or send one or more error messages (e.g., to event recording computing platform 130, client computing device 165, recipient computing device 175, and/or one or more other systems and/or devices). Alternatively, if event orchestration computing platform 110 determines that the second delivery selection information identifying the second destination for the second event received from the second recipient computing device associated with the second event (e.g., recipient computing device 175) is valid, the event sequence may continue to step 230 as illustrated in FIG. 2H.

At step 230, event orchestration computing platform 110 may send one or more event orchestration commands to external event processing interface 140. For example, at step 230, event orchestration computing platform 110 may generate, based on the second delivery selection information identifying the second destination for the second event received from the second recipient computing device associated with the second event (e.g., recipient computing device 175), one or more second event orchestration commands directing a second external event processor (e.g., external event processor 155) to execute one or more actions associated with the second event. For instance, event orchestration computing platform 110 may generate one or more commands directing and/or controlling external event processor 155 to execute one or more actions associated with the second event, such as one or more actions that perform and/or complete a payment transaction corresponding to the second event. For example, the one or more commands generated by event orchestration computing platform 110 may direct the second external event processor (e.g., external event processor 155) (which may, e.g., be associated with a particular digital wallet service, banking service, or the like) to transfer funds to the second destination selected by the user of the second recipient computing device associated with the second event (e.g., recipient computing device 175). In addition, at step 230, event orchestration computing platform 110 may send, via the communication interface (e.g., communication interface 115) and via the external event processing interface (e.g., external event processing interface 140), to the second external event processor (e.g., external event processor 155), the one or more second event orchestration commands directing the second external event processor (e.g., external event processor 155) to execute the one or more actions associated with the second event. In some instances, event orchestration computing platform 110 may send one or more orchestration commands directly to the second external event processor (e.g., external event processor 155) in addition to and/or instead of sending such commands via the external event processing interface (e.g., external event processing interface 140).

At step 231, event orchestration computing platform 110 may receive confirmation information from external event processing interface 140. For example, at step 231, event orchestration computing platform 110 may receive from external event processing interface 140 confirmation information indicating that one or more actions associated with the second event were performed and/or completed by one or more external event servers (e.g., external event processor 155) to which external event processing interface 140 is connected. At step 232, event orchestration computing platform 110 may send one or more update commands to event recording computing platform 130. For example, at step 232, event orchestration computing platform 110 may send one or more update commands to event recording computing platform 130 directing event recording computing platform 130 to update one or more records indicating that the second event has been completed and/or that one or more actions associated with the second event have been performed based on the one or more event orchestration commands sent to external event processing interface 140 by event orchestration computing platform 110 and/or based on the confirmation information received by event orchestration computing platform 110 from external event processing interface 140.

Figure 7:
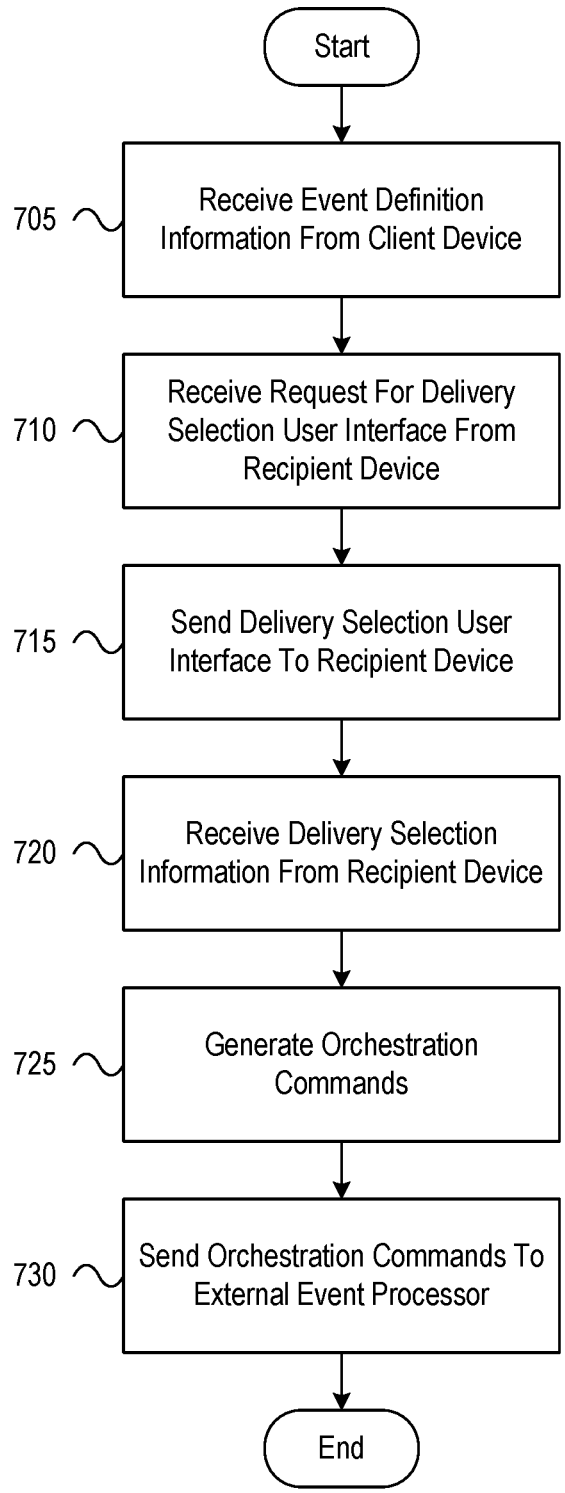
FIG. 7 depicts an illustrative method for multicomputer processing of client device request data with centralized event orchestration in accordance with one or more example embodiments.

FIG. 7 depicts an illustrative method for multicomputer processing of client device request data with centralized event orchestration in accordance with one or more example embodiments. Referring to FIG. 7, at step 705, a computing platform having at least one processor, a memory, and a communication interface may receive, via the communication interface, from a first client computing device, first event definition information defining a first event. At step 710, the computing platform may receive, via the communication interface, from a first recipient computing device associated with the first event, a request for a first delivery selection user interface. At step 715, the computing platform may send, via the communication interface, to the first recipient computing device associated with the first event, the first delivery selection user interface. At step 720, the computing platform may receive, via the communication interface, from the first recipient computing device associated with the first event, first delivery selection information identifying a first destination for the first event selected by a user of the first recipient computing device associated with the first event. At step 725, the computing platform may generate, based on the first delivery selection information identifying the first destination for the first event received from the first recipient computing device associated with the first event, one or more first event orchestration commands directing a first external event processor to execute one or more actions associated with the first event. At step 730, the computing platform may send, via the communication interface and via an external event processing interface, to the first external event processor, the one or more first event orchestration commands directing the first external event processor to execute the one or more actions associated with the first event.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform, comprising:
   at least one processor;
   a communication interface communicatively coupled to the at least one processor; and
   memory storing computer-readable instructions that, when executed by the at least one processor, cause the computing platform to:

receive, via the communication interface, from a first client computing device, first event definition information defining a first event;

receive, via the communication interface, from a first recipient computing device associated with the first event, a request for a first delivery selection user interface;

send, via the communication interface, to the first recipient computing device associated with the first event, the first delivery selection user interface;

receive, via the communication interface, from the first recipient computing device associated with the first event, first delivery selection information identifying a first destination for the first event selected by a user of the first recipient computing device associated with the first event;

generate, based on the first delivery selection information identifying the first destination for the first event received from the first recipient computing device associated with the first event, one or more first event orchestration commands directing a first external event processor to execute one or more actions associated with the first event; and send, via the communication interface and via an external event processing interface, to the first external event processor, the one or more first event orchestration commands directing the first external event processor to execute the one or more actions associated with the first event.

2. The computing platform of claim 1, wherein receiving the first event definition information defining the first event comprises receiving information defining one or more parameters of the first event from the first client computing device.

3. The computing platform of claim 2, wherein the information defining the one or more parameters of the first event comprises information defining the first event as a single event having a single occurrence.

4. The computing platform of claim 2, wherein the information defining the one or more parameters of the first event comprises information defining the first event as a recurring event having multiple occurrences.

5. The computing platform of claim 1, wherein the first recipient computing device associated with the first event is linked to a first alias identified as a recipient in the first event definition information.

6. The computing platform of claim 5, wherein the first alias identified as the recipient in the first event definition information comprises an email address.

7. The computing platform of claim 5, wherein the first alias identified as the recipient in the first event definition information comprises a mobile telephone number.

8. The computing platform of claim 1, wherein the first delivery selection user interface comprises a first user-selectable control element that, when invoked by the user of the first recipient computing device associated with the first event, causes the first recipient computing device associated with the first event to generate the first delivery selection information identifying the first destination for the first event.

9. The computing platform of claim 1, wherein the memory stores additional computer-readable instructions that, when executed by the at least one processor, cause the computing platform to:

prior to sending the first delivery selection user interface to the first recipient computing device associated with the first event:

send, via the communication interface, to a user interface computing platform, one or more commands directing the user interface computing platform to generate the first delivery selection user interface; and receive, via the communication interface, from the user interface computing platform, the first delivery selection user interface.

10. The computing platform of claim 1, wherein the memory stores additional computer-readable instructions that, when executed by the at least one processor, cause the computing platform to:

prior to generating the one or more first event orchestration commands directing the first external event processor to execute the one or more actions associated with the first event, validate the first delivery selection information identifying the first destination for the first event received from the first recipient computing device associated with the first event.

11. The computing platform of claim 1, wherein the memory stores additional computer-readable instructions that, when executed by the at least one processor, cause the computing platform to:

receive, via the communication interface, from a second client computing device, second event definition information defining a second event;

receive, via the communication interface, from a second recipient computing device associated with the second event, a request for a second delivery selection user interface;

send, via the communication interface, to the second recipient computing device associated with the second event, the second delivery selection user interface;

receive, via the communication interface, from the second recipient computing device associated with the second event, second delivery selection information identifying a second destination for the second event selected by a user of the second recipient computing device associated with the second event;

generate, based on the second delivery selection information identifying the second destination for the second event received from the second recipient computing device associated with the second event, one or more second event orchestration commands directing a second external event processor to execute one or more actions associated with the second event; and send, via the communication interface and via the external event processing interface, to the second external event processor, the one or more second event orchestration commands directing the second external event processor to execute the one or more actions associated with the second event.

12. The computing platform of claim 11, wherein receiving the second event definition information defining the second event comprises receiving information defining one or more parameters of the second event from the second client computing device.

13. The computing platform of claim 12, wherein the information defining the one or more parameters of the second event comprises information defining the second event as a single event having a single occurrence.

14. The computing platform of claim 12, wherein the information defining the one or more parameters of the second event comprises information defining the second event as a recurring event having multiple occurrences.

15. The computing platform of claim 11, wherein the second recipient computing device associated with the second event is linked to a second alias identified as a recipient in the second event definition information.

16. The computing platform of claim 15, wherein the second alias identified as the recipient in the second event definition information comprises an email address.

17. The computing platform of claim 15, wherein the second alias identified as the recipient in the second event definition information comprises a mobile telephone number.

18. The computing platform of claim 11, wherein the second delivery selection user interface comprises a second user-selectable control element that, when invoked by the user of the second recipient computing device associated with the second event, causes the second recipient computing device associated with the second event to generate the second delivery selection information identifying the second destination for the second event.

19. A method, comprising:
at a computing platform comprising at least one processor, memory, and a communication interface:
receiving, by the at least one processor, via the communication interface, from a first client computing device, first event definition information defining a first event;
receiving, by the at least one processor, via the communication interface, from a first recipient computing device associated with the first event, a request for a first delivery selection user interface;
sending, by the at least one processor, via the communication interface, to the first recipient computing device associated with the first event, the first delivery selection user interface;
receiving, by the at least one processor, via the communication interface, from the first recipient computing device associated with the first event, first delivery selection information identifying a first destination for the first event selected by a user of the first recipient computing device associated with the first event;
generating, by the at least one processor, based on the first delivery selection information identifying the first destination for the first event received from the first recipient computing device associated with the first event, one or more first event orchestration commands directing a first external event processor to execute one or more actions associated with the first event; and
sending, by the at least one processor, via the communication interface and via an external event processing interface, to the first external event processor, the one or more first event orchestration commands directing the first external event processor to execute the one or more actions associated with the first event.

20. One or more non-transitory computer-readable media storing instructions that, when executed by a computing platform comprising at least one processor, memory, and a communication interface, cause the computing platform to:
receive, via the communication interface, from a first client computing device, first event definition information defining a first event;
receive, via the communication interface, from a first recipient computing device associated with the first event, a request for a first delivery selection user interface;
send, via the communication interface, to the first recipient computing device associated with the first event, the first delivery selection user interface;
receive, via the communication interface, from the first recipient computing device associated with the first event, first delivery selection information identifying a first destination for the first event selected by a user of the first recipient computing device associated with the first event;
generate, based on the first delivery selection information identifying the first destination for the first event received from the first recipient computing device associated with the first event, one or more first event orchestration commands directing a first external event processor to execute one or more actions associated with the first event; and
send, via the communication interface and via an external event processing interface, to the first external event processor, the one or more first event orchestration commands directing the first external event processor to execute the one or more actions associated with the first event.

* * * * *